United States Patent
Moore et al.

(10) Patent No.: US 10,171,511 B2
(45) Date of Patent: Jan. 1, 2019

(54) MEDIA SESSION BETWEEN NETWORK ENDPOINTS

(71) Applicant: Microsoft Technology Licensing, LLC, Redmond, WA (US)

(72) Inventors: Timothy Mark Moore, Bellevue, WA (US); Tin Qian, Bellevue, WA (US); Rajesh Gunnalan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/945,293

(22) Filed: Nov. 18, 2015

(65) Prior Publication Data

US 2016/0094591 A1    Mar. 31, 2016

Related U.S. Application Data

(63) Continuation-in-part of application No. 14/497,058, filed on Sep. 25, 2014.

(51) Int. Cl.
  *G06F 15/16* (2006.01)
  *H04L 29/06* (2006.01)
  *H04L 29/12* (2006.01)

(52) U.S. Cl.
  CPC ...... *H04L 65/1006* (2013.01); *H04L 61/2564* (2013.01); *H04L 65/1069* (2013.01);
  (Continued)

(58) Field of Classification Search
  USPC .................. 709/204, 223, 227, 228
  See application file for complete search history.

(56) References Cited

U.S. PATENT DOCUMENTS 6,115,580 A  9/2000 Chuprun et al.
7,788,383 B2  8/2010 Andreasen
(Continued)

FOREIGN PATENT DOCUMENTS

CA     2591183    12/2008
CN    102685268     9/2012
(Continued)

OTHER PUBLICATIONS

"International Search Report and Written Opinion", Application No. PCT/US2015/051972, dated Dec. 23, 2015, 12 pages.
(Continued)

*Primary Examiner* — Joseph E Avellino
*Assistant Examiner* — Marshall M McLeod
(74) *Attorney, Agent, or Firm* — Schwegman Lundberg & Woessner, P.A.

(57) ABSTRACT

A media session is established between a first endpoint and a second endpoint via a communication network based on connectivity checks performed by the endpoints. A set of candidate pairs, each comprising a first network address available to the first endpoint and a second network address available to the second endpoint, is generated. To each candidate pair of the candidate pair set, a respective priority is assigned. If none of the criteria is determined to be met by the first endpoint, the priorities are assigned by the first endpoint according to a standardized networking protocol as specified by the standardized networking protocol, and if any of the criteria is determined to be met by the first endpoint, at least one of the priorities assigned by the first endpoint is different from that specified by the standardized networking protocol.

21 Claims, 11 Drawing Sheets

(52) U.S. Cl.
CPC ...... *H04L 61/2514* (2013.01); *H04L 61/2575* (2013.01); *H04L 61/2589* (2013.01)

(56) References Cited

U.S. PATENT DOCUMENTS

| | | |
|---|---|---|
| 7,796,620 B2 | 9/2010 | Elwell |
| 7,885,278 B2 | 2/2011 | Zhu |
| 7,912,040 B2 | 3/2011 | Wright |
| 7,941,551 B2 | 5/2011 | Anantharaman et al. |
| 7,953,010 B2 | 5/2011 | Rodrig |
| 8,060,626 B2 | 11/2011 | Roy et al. |
| 8,099,500 B2 | 1/2012 | Deason |
| 8,289,845 B1 | 10/2012 | Baldonado et al. |
| 8,312,169 B2 | 11/2012 | Perumal et al. |
| 8,325,741 B2 | 12/2012 | Zhu |
| 8,356,344 B2 | 1/2013 | Lin et al. |
| 8,363,744 B2 | 1/2013 | Agee et al. |
| 8,385,326 B2 | 2/2013 | Khan et al. |
| 8,432,896 B2 | 4/2013 | Foster et al. |
| 8,526,334 B2 | 9/2013 | Constantinescu |
| 8,601,144 B1 | 12/2013 | Ryner |
| 8,601,155 B2 | 12/2013 | Toombs et al. |
| 8,639,844 B2 | 1/2014 | Kumarasamy et al. |
| 8,644,164 B2 | 2/2014 | Averi et al. |
| 8,699,366 B2 | 4/2014 | Rodrig |
| 8,725,885 B1 | 5/2014 | Ryner |
| 8,767,716 B2 | 7/2014 | Trabelsi et al. |
| 8,867,553 B2 | 10/2014 | Eronen et al. |
| 8,917,311 B1 | 12/2014 | Yang et al. |
| 8,977,730 B2 | 3/2015 | Nagpal et al. |
| 8,982,708 B1 | 3/2015 | McCabe et al. |
| 9,203,872 B2 | 12/2015 | Gunnalan et al. |
| 9,596,272 B2 | 3/2017 | Gunnalan et al. |
| 2004/0136324 A1 | 7/2004 | Steinberg et al. |
| 2006/0104199 A1 | 5/2006 | Katukam et al. |
| 2007/0002740 A1 | 1/2007 | Evans et al. |
| 2008/0043716 A1 | 2/2008 | Toombs et al. |
| 2008/0080568 A1 | 4/2008 | Hughes et al. |
| 2008/0304419 A1 | 12/2008 | Cooper et al. |
| 2009/0201937 A1 | 8/2009 | Bragg et al. |
| 2009/0245234 A1 | 10/2009 | Parameswar et al. |
| 2010/0027418 A1* | 2/2010 | Rodrig .................. H04L 41/147 370/235 |
| 2010/0165976 A1 | 7/2010 | Khan et al. |
| 2010/0205653 A1 | 8/2010 | Eronen et al. |
| 2010/0217874 A1* | 8/2010 | Anantharaman ......................... H04L 29/12528 709/228 |
| 2010/0293297 A1 | 11/2010 | Perumal et al. |
| 2011/0194421 A1 | 8/2011 | Rodrig |
| 2011/0208802 A1* | 8/2011 | Gunnalan ........... H04L 41/0893 709/203 |
| 2012/0047270 A1 | 2/2012 | Chandrasekaran et al. |
| 2012/0158974 A1* | 6/2012 | Perumal ............ H04L 29/12528 709/227 |
| 2013/0185440 A1 | 7/2013 | Blau et al. |
| 2014/0024383 A1 | 1/2014 | Rahman et al. |
| 2014/0029462 A1 | 1/2014 | Stewart |
| 2014/0082217 A1 | 3/2014 | Lohner et al. |
| 2014/0136718 A1 | 5/2014 | Menezes et al. |
| 2014/0150075 A1* | 5/2014 | Ryner ...................... G06F 21/45 726/5 |
| 2014/0169170 A1 | 6/2014 | Almog et al. |
| 2014/0269728 A1 | 9/2014 | Jalan et al. |
| 2015/0023174 A1 | 1/2015 | Dasgupta et al. |
| 2015/0030016 A1 | 1/2015 | Larkin |
| 2015/0188882 A1 | 7/2015 | Wang et al. |
| 2015/0281642 A1 | 10/2015 | Yang et al. |
| 2016/0080502 A1 | 3/2016 | Yadav et al. |
| 2016/0094586 A1 | 3/2016 | Gunnalan et al. |
| 2016/0094589 A1 | 3/2016 | Gunnalan et al. |
| 2016/0164787 A1 | 6/2016 | Roach et al. |
| 2016/0174239 A1 | 6/2016 | Tietsch et al. |
| 2017/0142164 A1 | 5/2017 | Moore et al. |
| 2017/0142165 A1 | 5/2017 | Moore et al. |

FOREIGN PATENT DOCUMENTS

| | | |
|---|---|---|
| EP | 2001204 | 12/2008 |
| WO | WO-2009058640 | 5/2009 |
| WO | WO-2010082982 | 7/2010 |

OTHER PUBLICATIONS

"Non-Final Office Action", U.S. Appl. No. 14/497,141, dated Jun. 6, 2016, 16 pages.

"[MS-ICE2]: Interactive Connectivity Establishment (ICE) Extensions 2.0", Available at: https://msdn.microsoft.com/en-us/library/office/cc431504(v=office.12).aspx, Sep. 4, 2015, 40 pages.

"[MS-ICE2]: Interactive Connectivity Establishment (ICE) Extensions 2.0", Available at: <http://download.microsoft.com/download/1/6/F/16F4E321-AA6B-4FA3-8AD3-E94C895A3C97/[MS-ICE2].pdf>:, Feb. 10, 2014, 40 pages.

"Cisco Jabber Videofor TelePresence", Available at: http://www.cisco.com/c/dam/en/us/td/docs/telepresence/endpoint/movi/admin_guide/JabberVideo_Admin_Guide_4-4.pdf, Feb. 2012, 36 pages.

"Interactive Connectivity Establishment (ICE) 2.0 Bandwidth Management Extensions", Retrieved from the Internet: URL:http://download.microsoft.com/download/1/6/F/16F4E321-AA6B-4FA3-8AD3-E94C895A3C97/0fficeProto.zip, Sep. 4, 2015, 31 pages.

"Interactive Connectivity Establishment (ICE) Extensions 2.0—1.3 Overview", Retrieved From: <http://msdn.microsoft.com/en-us/library/dd923690(v=office.12).aspx> Dec. 24, 2014, 2014, 3 pages.

"International Search Report and Written Opinion", Application No. PCT/US2015/051940, dated Dec. 14, 2015, 13 pages.

"Traversal using Relay NAT (TURN) Bandwidth Management Extensions", Retrieved from the Internet: URL:http://download.microsoft.com/download/1/6/F/16F4E321-AA6B-4FA3-8AD3-E94C895A3C97/0fficeProto.zip, Sep. 4, 2015, 48 pages.

Andersson,"Network Address Translator Traversal for the Peer-to-Peer Session Initiation Protocol on Mobile Phones", Proceedings: In Master's Thesis, Aalto University School of Science and Technology Available at: <http://lib.tkk.fi/Dipl/2010/urn100205.pdf>, May 10, 2010, 118 pages.

Camarillo,"Automatic Flow-Specific Multi-Path Management for the Host Identity Protocol (HIP)", In Proceedings of IEEE Wireless Communications and Networking Conference, Apr. 18, 2010, 6 pages.

Ciminiera,"Distributed Connectivity Service for a SIP Infrastructure", In Journal of IEEE Network, vol. 22, Issue 5, Sep. 2008, pp. 33-40.

Dowling,"Improving ICE Service Selection in a P2P System using the Gradient Topology", In Proceedings of First International Conference on Self-Adaptive and Self-Organizing Systems, Jul. 9, 2007, 4 pages.

Keranen,"Host Identity Protocol-based Network Address Translator Traversal in Peer-to-Peer Environments", Proceedings: In Master's Thesis, Helsinki University of Technology Available at: <http://lib.tkk.fi/Dipl/2008/urn012452.pdf>, Sep. 8, 2008, 103 pages.

Lane,"Path Brokering for End-Host Path Selection: Toward a Path-Centric Billing Method for a Multipath Internet", In Proceedings of the ACM CoNEXT Conference Article No. 69, Dec. 9, 2008, 6 pages.

Liang,"TRECON: A Framework for Enforcing Trusted ISP Peering", In Proceedings of 15th International Conference on Computer Communications and Networks, Oct. 9, 2006, 7 pages.

Reddy,"Happy Eyeballs Extension for ICE", Available at: https://tools.ietf.org/html/draft-reddy-mmusic-ice-happy-eyeballs-00, Oct. 4, 2012, 10 pages.

Rosenberg,"Interactive Connectivity Establishment (ICE): A Protocol for Network Address Translator (NAT) Traversal for Offer/Answer Protocols", Available at: https://www.rfc-editor.org/rfc/pdfrfc/rfc5245.txt.pdf, Apr. 2010, 117 pages.

Rosenberg,"TCP Candidates with Interactive Connectivity Establishment (ICE) draft-ietf-mmusic-ice-tcp-12", Proceedings: In Internet-Drafts Available at: <http://64.170.98.42/pdf/draft-ietf-mmusic-ice-tcp-12.pdf>, Feb. 2, 2011, 29 pages.

(56) References Cited

OTHER PUBLICATIONS

Thomson, "Using Interactive Connectivity Establishment (ICE) in Web Real-Time Communications (WebRTC)", Available at: https://tools.ietf.org/html/draft-thomson-mmusic-ice-webrtc-01#section-2.1.1, Oct. 19, 2013, 18 pages.

Wang, "A P2P—Grid Model for Traversing NAT in SIP Communication", In Proceedings of Ninth International Conference on Hybrid Intelligent Systems, vol. 3, Aug. 12, 2009, 4 pages.

Yuan, "iVoIP: an Intelligent Bandwidth Management Scheme for VoIP in WLANs", In Journal of Wireless Networks, vol. 20, Issue 3, Apr. 2014, 29 pages.

"International Search Report and Written Opinion", Application No. PCT/US2016/061770, dated Feb. 10, 2017, 13 pages.

"Final Office Action", U.S. Appl. No. 14/497,058, dated Feb. 9, 2017, 28 pages.

"International Preliminary Report on Patentability", Application No. PCT/US2015/051940, dated Jan. 10, 2017, 8 pages.

"Notice of Allowance", U.S. Appl. No. 14/497,141, dated Oct. 26, 2016, 10 pages.

"Non-Final Office Action", U.S. Appl. No. 14/497,058, dated Jul. 12, 2016, 26 pages.

"Second Written Opinion", Application PCT/US2015/051940, dated Aug. 8, 2016, 4 pages.

"International Search Report and Written Opinion", Application No. PCT/US2016/061774, dated Feb. 3, 2017, 14 pages.

Rosenberg, "Session Traversal Utilities for NAT (STUN)", Network Working Group; Request for Comments: 5389; https://tools.ietf.org/html/rfc5389, Oct. 2008, 51 pages.

Tseng, "WiFi Assisted NAT Traversal Scheme for Surveillance Patrol Robot", Article in Nonlinear Dynamics 76(1), Mar. 6, 2013, 12 pages.

"Second Written Opinion Issued in PCT Application No. PCT/US2016/061774", dated Oct. 17, 2017, 9 Pages.

"Second Written Opinion Issued in PCT Application No. PCT/US2016/061770", dated Oct. 19, 2017, 6 Pages.

"International Preliminary Report on Patentability Issued in PCT Application No. PCT/US2016/061770", dated Jan. 24, 2018, 8 Pages.

"International Preliminary Report on Patentability Issued in PCT Application No. PCT/US2016/061774", dated Feb. 19, 2018, 10 Pages.

"Non-Final Office Action Issued in U.S. Appl. No. 14/945,280", dated Nov. 17, 2017, 31 Pages.

"Non-Final Office Action Issued in U.S. Appl. No. 14/497,058", dated Sep. 15, 2017, 31 Pages.

"Non-Final Office Action Issued in U.S. Appl. No. 14/945,302", dated Nov. 30, 2017, 27 Pages.

Rosenberg, J., "Interactive Connectivity Establishment (ICE): A Methodology for Network Address Translator (NAT) Traversal for Offer/Answer Protocols", [online]. Retrieved from the Internet: <URL: http://tools/ietf.org/html/draft-ietf-mmusic-ice-13>, (Jan. 16, 2007), 82 Pages.

"Final Office Action Issued in U.S. Appl. No. 14/497,058", dated May 3, 2018, 38 Pages.

"Notice of Allowance Issued in U.S. Appl. No. 14/945,302". dated May 22, 2018, 15 Pages.

\* cited by examiner

MEDIA SESSION BETWEEN NETWORK ENDPOINTS

RELATED APPLICATIONS

This application claims priority to and is a Continuation in Part of U.S. patent application Ser. No. 14/497,058, filed Sep. 25, 2014, the disclosure of which is contained herein in its entirety by reference.

BACKGROUND

A communication network typically includes different types of network nodes, such as user devices, routers, network address translators (NATs), media relay servers etc., which perform different functions within the network. Communication between two communicating nodes (endpoints, such as user devices) may be via other nodes of the network (intermediate nodes, such as routers, NATs and media relay servers). The network may have a layered architecture, whereby different logical layers provide different types of node-to-node communication services. Each layer is served by the layer immediately below that layer (other than the lowest layer) and provides services to the layer immediately above that layer (other than the highest layer). The network may be a packet-based network and/or an internet.

A media session may be established between two endpoints, such as user devices, connected via a communication network so that real-time media can be transmitted and received between those endpoints via the network. An example of a media session is a SIP ("Session Initiation Protocol") media session. The media session may be a Voice or Video over IP (VOIP) session, in which audio and/or video of a call is transmitted and received between the endpoints in the VOIP session. Endpoints and other types of network node may be identified by a network address (e.g. IP ("Internet Protocol") address), with the session being established between transport addresses associated with the endpoints. A transport address is a combination of a network address (e.g. IP address) and a port associated with that network address.

To establish the media session, one of the endpoints may transmit a media session request to the other endpoint. Herein, an endpoint that initiates a request for a media session (e.g. audio/video communications) is called an "initiating endpoint" or equivalently a "caller endpoint". An endpoint that receives and processes the communication request from the caller is called a "responding endpoint" or "callee endpoint". Each endpoint may have multiple associated transport addresses e.g. a local transport address, a transport address on the public side of a NAT, a transport address allocated on a relay server etc. During media session establishment, for each endpoint, a respective address is selected for that endpoint to use to transmit and receive data in the media session. For example, the addresses may be selected in accordance with the ICE ("Interactive Connectivity Establishment") protocol. Once the media session is established, media can flow between those selected addresses of the different endpoints. To select a path, a list of so-called "candidate pairs" is generated, each of which comprises a network address available to a first of the endpoint—"local" candidates from the perspective of the first endpoint, though note that "local" in this context is not restricted to host addresses on its local interface, and can also include reflexive addresses on the public side of the NA, or a relay network address of a media relay server that can relay media data to the first endpoint—and a network address available to the second endpoint ("remote" candidates from the perspective of the first endpoint). Every possible pairing of local and remote candidates may be checked to determine whether or not it is valid, by sending one or more probe messages from the local address to the remote address during so-called "connectivity checks".

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure relates to the establishment of a media session between a first endpoint and a second endpoint via a communication network, so that media data (audio and/or video data) can be transmitted between the endpoints in the established media session. The media session is established based on connectivity checks performed by the endpoints.

In accordance with various aspects of the subject matter, under certain circumstances, the order in which connectivity checks are performed is intentionally changed in certain circumstances, relative to the ordering specified by a standardized networking protocol (such as but not limited to the ICE protocol), to adapt to those particular circumstances. This allows candidate pairs that are more likely to be valid and/or which are more likely to be used, i.e. candidate pairs that are more viable in the circumstances, to be checked sooner than those less likely to be valid and/or used, i.e. less viable candidate pairs in the circumstances—even if the less viable candidate pairs are designate as higher priority candidates than the former by according to the strict rules laid down by the standardized protocol. Prioritizing more viable candidate pairs in this manner, in a way that deviated from the protocol, makes more efficient use of bandwidth during connectivity checks, as it decreases the likelihood of connectivity checks being performed for less viable candidates, hence decreases the likelihood of bandwidth being wasted checking less viable candidates.

At least the first endpoint (and, in some cases, both the first and second endpoints) determines whether at least one of a set of one or more reduced connectivity check criteria is met. This determination can be made in a wide variety of ways, for example based on direct measurement by the first endpoint, for example instigated by the first endpoint according to the TURN or STUN protocols; and/or by accessing one or more local and/or remote parameters, as set by a network operator or administrator (for example); and/or based on one or messages received from the second endpoint and/or a server, e.g. which the second endpoint and/or server has generated based on its own direct measurement and/or parameters.

At the first endpoint a set of candidate pairs for connectivity checks is generated by exchanging network addresses between the first and second endpoints. Each candidate pair of the set comprises a first network address available to the first endpoint and a second network address available to the second endpoint. The first endpoint assigns to each candidate pair of the candidate pair set, a respective priority. If none of the criteria is determined to be met by the first endpoint, the priorities are assigned by the first endpoint according to a standardized networking protocol as specified by the standardized networking protocol. If any of the criteria is determined to be met by the first endpoint, at least one of the priorities assigned by the first endpoint is different from that specified by the standardized networking protocol. The media session is established using a candidate pair of the generated set determined to be valid by the endpoints performing connectivity checks for at least two of candidate pairs of the generated set in turn, in order of their determined priorities.

BRIEF DESCRIPTION OF FIGURES

To aid understanding of the subject matter and to show how the same may be carried into effect, reference will now be made by way of example only to the following drawings in which.

DETAILED DESCRIPTION OF EMBODIMENTS

Figure 1:
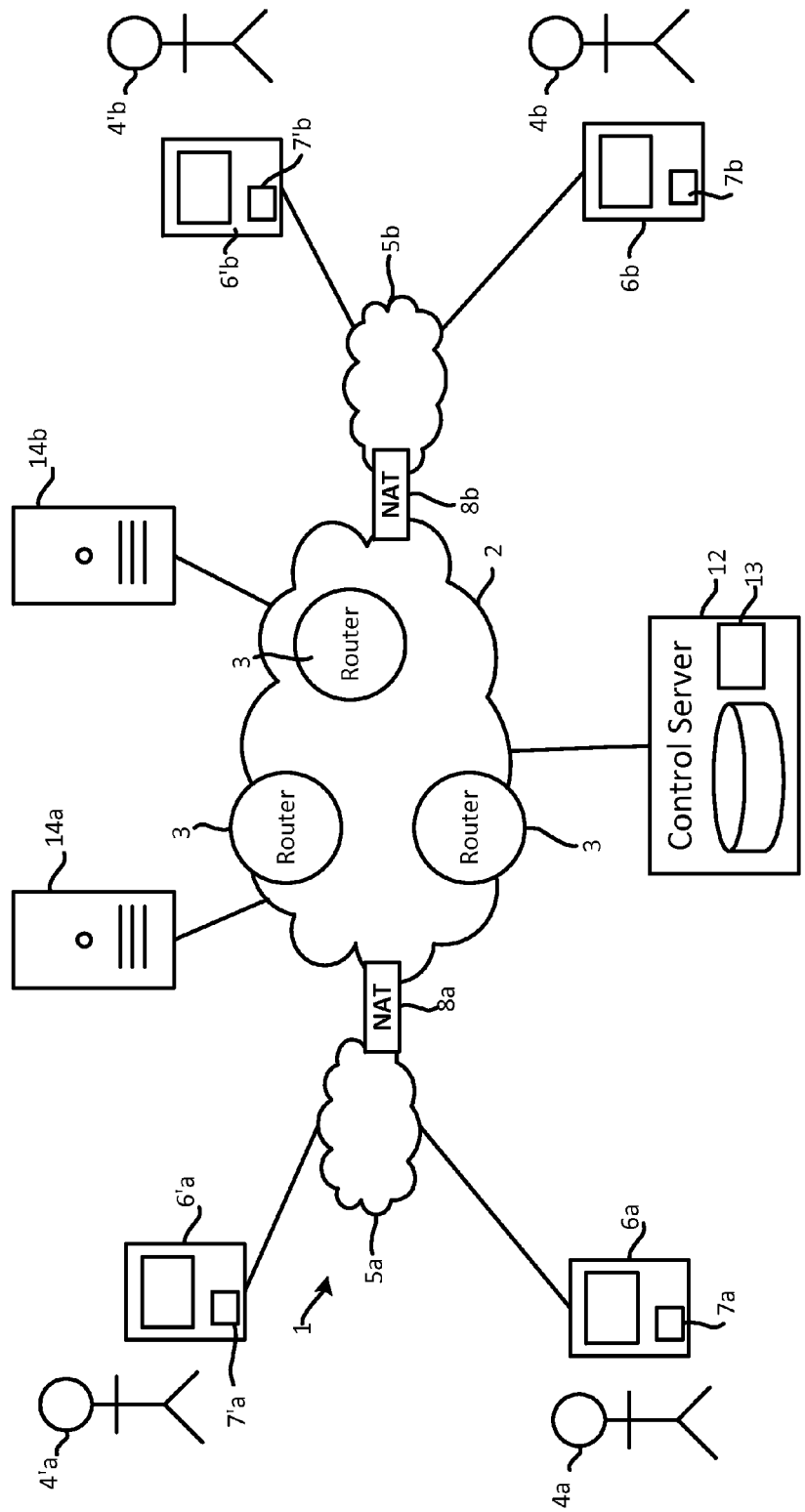
FIG. 1 shows a communication system.

A real-time call generally proceeds in two phases: an initial signalling phase during which a valid connection path is determined, for example based on the ICE protocol, so as to allow call media (audio/video data) to flow between endpoints in a subsequent media flow phase.

ICE is a protocol that is used for establishing connectivity for VOIP sessions traversing network address translators (NATs) and firewalls. It focuses on establishing the most efficient path in terms of media latency to ensure ideal media quality. The CE protocol attempts to identify the most efficient path by trying the different paths based on their "static priorities".

With the increase in number of mobile endpoints and penetration of VOIP technologies, the inventors of the present subject matter have observed an increasing number of users attempting to establish calls from networks which have very limited bandwidth. For such bandwidth constrained networks the ICE mechanism as defined in RFC 5245 can result in saturating the network resulting in call establishment failures, selection of a sub-optimal path and impacting quality of existing modalities.

The described embodiments of the present subject matter significantly reduce the bandwidth required for connectivity establishment enabling calls (or other media sessions) to be successfully established, and has particular though not exclusive applicability to bandwidth constrained networks.

ICE provides a generic framework for one aspect of the call signaling phase that specifies a pairing up all the possible "candidates" from the caller and callee endpoints, and probing all the potential paths for connectivity in the connectivity checks.

A candidate comprises a network address available to one of the endpoints, which may be a local network address of a network interface local to that device ("host candidate"), a network address on the public side of a NAT or firewall behind which the endpoint is located, wherein the NAT/firewall can receive at that address media data on behalf of the endpoint and route it to the endpoint ("reflexive candidate") or a network of a media relay server which can receive at that address media data on behalf of the endpoint, and relay the received media data to the endpoint ("relay candidate"). These network addresses are "candidates", in the sense that it may not always be possible to establish a media session between every candidate network address available to the caller and every candidate network address available to the callee. For example, where the caller and callee are located behind different NATs, it is generally not possible to establish a connection between their host network addresses directly over the public Internet (see below).

A candidate may additionally denote a specific networking protocol, in particular a transport layer or network protocol—for example, one network address available to one of the endpoint may give rise to two candidates, e.g. a TCP candidate and a UDP candidate for that address (TCP and UDP being transport layer protocols). In some cases it may be possible to establish a media session between two candidate network addresses using, say, TCP but not UDP for example if one or both of the endpoints are behind UDP-blocking firewalls. An another example, a candidate pair may denote one of IUPv6 or IPv6, depending on whether the IP addresses it contains are IPv4 or IPv6 addresses (IPv4 and IPv6 being network layer protocols)

In accordance with ICE, each candidate performed a candidate "gathering" phase, in which each of the endpoints identifies every candidate available to it. The endpoints then exchange candidates, by each endpoint transmitting to the other endpoint its gathered candidates.

Each endpoint then determines every possible pairing of every one of its own gathered candidate ("local" candidates from the perspective of that endpoint) with every one of the candidates received from the other endpoint ("remote" candidates), in a candidate pairing process, in preparation for connectivity checks. Each candidate is only paired with other candidates that denote the same network protocol e.g. TCP and UDP candidates are only paired with other TCP and DUP candidates respectively. Aside from that restriction, every possible ('local candidate', 'remote candidate') candidate pair is eligible for connectivity checks, i.e. (host, host), (host, reflexive), (host, relay), (reflexive, host), (reflexive, reflexive), (reflexive, relay), (relay, host), (relay, reflexive), (relay, relay) for each specified protocol. The determined candidate pairs are organized into a set of candidate pairs ("candidate pair set") for connectivity checks—a so-call "check list" (see below), which is an ordered list of the determined candidate pairs. The ordering is defined by the ICE protocol, based on "static priorities" defined by the ICE protocol (see below).

During connectivity checks, a given candidate pairs is checked, by the local endpoint sending a number of probe messages from the local candidate address of that pair to the remote candidate address of that pair. "From" in this context means specifying the local candidate as a return address, i.e. identifying it as the network address to which a response to the probe message should be transmitted by the remote endpoint, e.g. in a combination of outgoing IP and TCP/UDP headers—see below.

If the local endpoint receives a reply in response to at least one of the probe message(s) within a response interval, that candidate pair is determined to be valid.

Candidate pairs in the check list are checked in order (that is, in order of static priority)—thus depending on the circumstances, at least one probe message may be sent for every candidate pair in the check list (i.e. provided the connectivity checks do not terminate before the end of the check list is reached). Moreover, the local endpoint may send multiple probe messages for any candidate pair in the check list, e.g. it may keep sending probe messages (retries) until a reply is received or connectivity checks terminate.

Connectivity checks typically end when the highest priority path is validated or when a predetermined timeout is reached, depending on the implementation.

On the one hand, this provides a highly robust media session establishment mechanism—if there is a path between the endpoint via which media can flow, it is almost guaranteed to be found.

On the other hand, as recognized by the present disclosure, this does mean that, before media data has even started flowing between the endpoints, significant bandwidth may be consumed through (i) the gathering of multiple reflexive and relay candidates (as these requires signaling—see below), (ii) the exchange of multiple gathered candidates between the endpoints and (iii) the transmission of multiple probe messages for multiple candidate pairs as part of the connectivity checks. This is particularly, though not exclusively, an issue in bandwidth constrained network such as cellular networks, to the extent that, following this conventional ICE approach, the connectivity checks in themselves can saturate bandwidth constrained links resulting in call establishment failures or impact the quality of existing media streams already-established between other endpoints sharing the same network.

The present disclosure recognises that in certain circumstances, allowing greater flexibility than that specified with the rigid rules of the ICE protocol can lead to bandwidth savings to be made during the signalling phase of call setup, particularly in bandwidth constrained networks. Such bandwidth saving can, in embodiment of the present subject matter, be achieved variously by:

1. Pruning candidate(s) and/or candidate pair(s) i.e. excluding certain candidate pair(s) from being eligible for connectivity checks so as to guarantee that connectivity checks are not performed for that pair i.e. guaranteeing that no probe messages are sent for that candidate pair, for example where the candidate pair is unlikely to be valid in the circumstances or unlikely to be used in the current circumstances; and/or
2. Limiting the extent to which connectivity checks are performed for particular candidate pair(s), i.e. restricting the number of probe messages that are sent for that candidate pairs, i.e. reducing the number of retries for that pair in the connectivity checks, for example where the candidate pair is unlikely to be valid or used in the current circumstances; and/or
3. Changing the order in which candidate pairs are checked, i.e. ordering the check list differently from the ordering specified by the ICE protocol, so as to "deprioritize" candidate pairs that are unlikely to be valid or used in the current circumstances.

In the context of 1, in some cases certain types of candidates may be pruned before candidate gathering e.g. an endpoint may not gather relay candidates at all in certain circumstances (see below). This can lead to bandwidth savings in all three of: the candidate gathering process, as it eliminates the signalling needed to gather relay candidate(s), for example between the endpoint and a TURN server; the candidate exchange process, as there are fewer candidates to be exchanges; and the connectivity checks phase, as there are fewer candidates to check. In other cases, full candidate gathering may take place, but certain pairing(s) may still be excluded, which can still lead to bandwidth savings in the connectivity checks phase.

Embodiments are described below by way of example only. First a context in which embodiment can be usefully applied will be described.

FIG. 1 is a schematic illustration of a communication system, which comprises: a public network 2, which is a packet-based internet (that is, a system of interconnected individual networks) e.g. the Internet, having a public address space; first and second endpoints, which are first and second user devices 6a, 6b operated by first and second users 4a, 4b; third and fourth endpoints, which are third and fourth user devices 6'a, 6'b operated by third and fourth users 4'a, 4'b; first and second media servers 14a, 14b; and a control server (telemetry server) 12. The public network 2 comprises a plurality of routers 3 which route traffic between different individual networks (not shown) of the public network 2.

The user devices 6a, 6'a are connected to, and are network nodes of, a first packed-based private network 5a and the user devices 6'a, 6'b are connected to, and are network nodes of, a second packet-based private network 5b.

Each node of a private network has a respective private network address in a private address space of that private network which other nodes connected to that same private network (and only such nodes) can use to communicate with that node over that private network (and only over that private network). That address is private in that it cannot be used to communicate with that node by devices which are not connected to that same private network e.g. it cannot be used within the public network 2. Moreover, whilst that address is unique within that private network, other nodes may use the same network address within different networks (e.g. the first and second user devices 5a, 5b might happen to have the same private network address but which is useable to communicate with the first user device 6a only within the first private network 5a and which is useable to communicate with the second user device 6b only within the second private network 5b).

To enable nodes of the first private network 5a (resp. second private network 5b) to communicate with the public network 2, the first (resp. second) private network is connected to the public network 2 via a first Network Address Translator (NAT) 8a (resp. second NAT 5b). Each NAT 5a, 5b—as well as having respective private network addresses in the first and second private address spaces of the first and second private network 5a, 5b respectively (referred to as an address on the private side of that NAT)—also has a respective public network address in the public address space of the public network 2 (referred to as an address on the public side of that NAT). Thus, not only can nodes of the first and second private network 5a,5b communicate with the first and second NATs 5a, 5b respectively using those NATs' private network addresses, but nodes outside of that private network can communicate with those NATs 5a, 5b using those NATs' public network addresses.

A NAT (e.g. 8a, 8b) operates as an interface between a private network (e.g. 5a, 5b) and public network (e.g. 2) by mapping the private address space of the private network into the public address space of the public network, thereby enabling nodes of the private network to communicate outside of the private network over the public network.

Nodes outside of one of the private networks (5a/5b) can direct traffic intended for a particular node of that private network to the relevant NAT (8*a*/8*b*) via the public network 2 using that NATs public address, which that NAT then forwards the traffic to that node via that private network.

The operation of a NAT is described in detail below.

The private networks 5*a*, 5*b* and public network 2 and constitute a communication network 1, of which the various user devices 6*a*, . . . , 6'*b*, NATs 8*a*, 8*b*, servers 12, 14*a*, 14*b* and routers 3 are network nodes. The communication network 1 is also an internet (which comprises the individual networks of the internet 2 as well as the private networks 5*a*, 5*b*).

The user devices 6*a*, 6*b* execute respective instances of communication client software 7*a*, 7*b* (client). The client enables the user devices 6*a*, 6*b* to establish media sessions between the user devices 6*a*, 6*b* over the network 1, for example to facilitate a real-time communication event (e.g. a voice and/or video call) between the user's 4*a*, 4*b* so that the users 4*a*, 4*b* can communicate with one another over the network 1, with call audio and/or video being transmitted and received between the devices 6*a*, 6*b* in the media session. The user devices 6'*a*, 6'*b* also execute respective instances of the client software 7'*a*, 7'*b* to similar effect.

Figure 2:
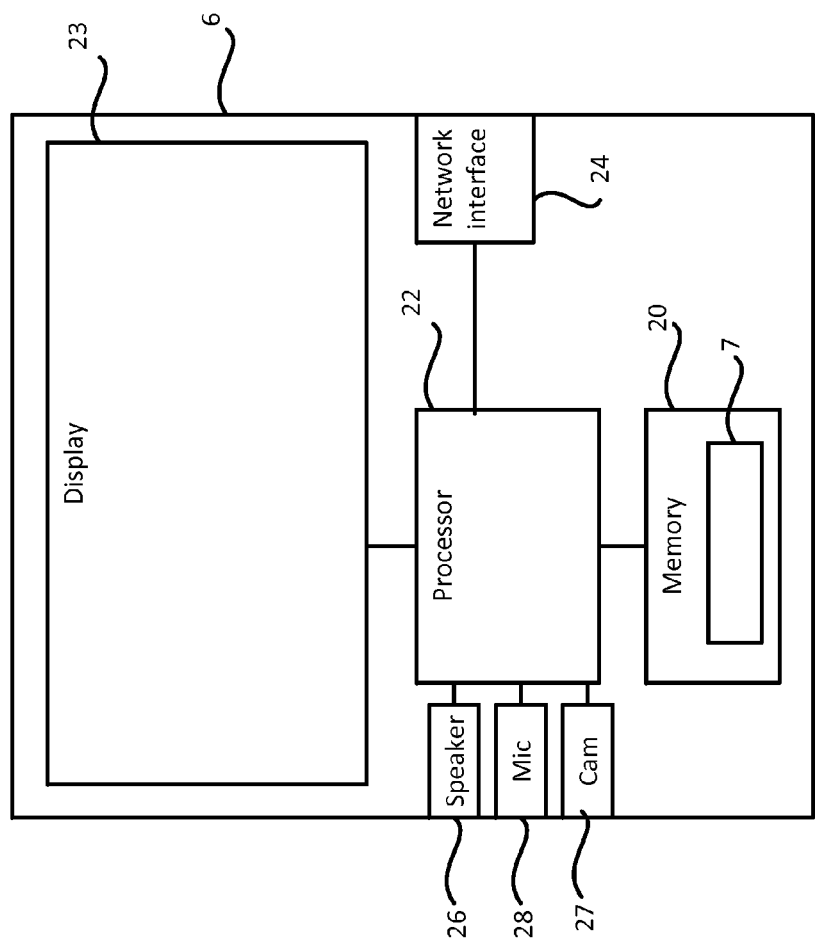
FIG. 2 shows a block diagram of a user device.

A user device may connect to the public network 2 by some other mechanism which does not involve any NATs though this is not shown in FIG. 2. For example, a user device may be connected via a Wi-Fi connection to a private network and to a public network via a mobile network with no NATs involved.

The control server 12 executes control code 13 for monitoring and controlling aspects of the communication between the various user devices in the manner described below.

FIG. 2 is a schematic block diagram of a user device 6 (e.g. 6*a*, 6*b*, 6'*a*, 6'*b*). The user device 6 is a computer device which can take a number of forms e.g. that of a desktop or laptop computer, mobile phone (e.g. smartphone), tablet computing device, wearable computing device, television (e.g. smart TV), set-top box, gaming console etc.

The user device 6 comprises a processor 22 to which is connected memory 20, one or more output devices, such as a display 23 and loudspeaker(s) 26, one or more input devices, such as a camera 27 and microphone 28, and a network interface 24, such as an Ethernet, Wi-Fi or mobile network (e.g. 3G, LTE etc.) interface which enables the user device 6 to connect to the network 1. The display 23 may comprise a touchscreen which can receive touch input from a user of the device 6, in which case the display 23 is also an input device of the user device 6. Any of the various components shown connected to the processor may be integrated in the user device 6, or non-integrated and connected to the processor 22 via a suitable external interface (wired e.g. Ethernet or wireless e.g. Wi-Fi).

The memory 20 holds a copy of the client 7 which, when executed on the processor 24, causes the user device 6 to implement the functionality of the client 7.

The client 7 has a user interface for receiving information from and outputting information to a user of the user device 6, including during a communication event such as a call. The user interface may comprise, for example, a Graphical User Interface (GUI) which outputs information via the display 23 and/or a Natural User Interface (NUI) which enables the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

Figure 3:
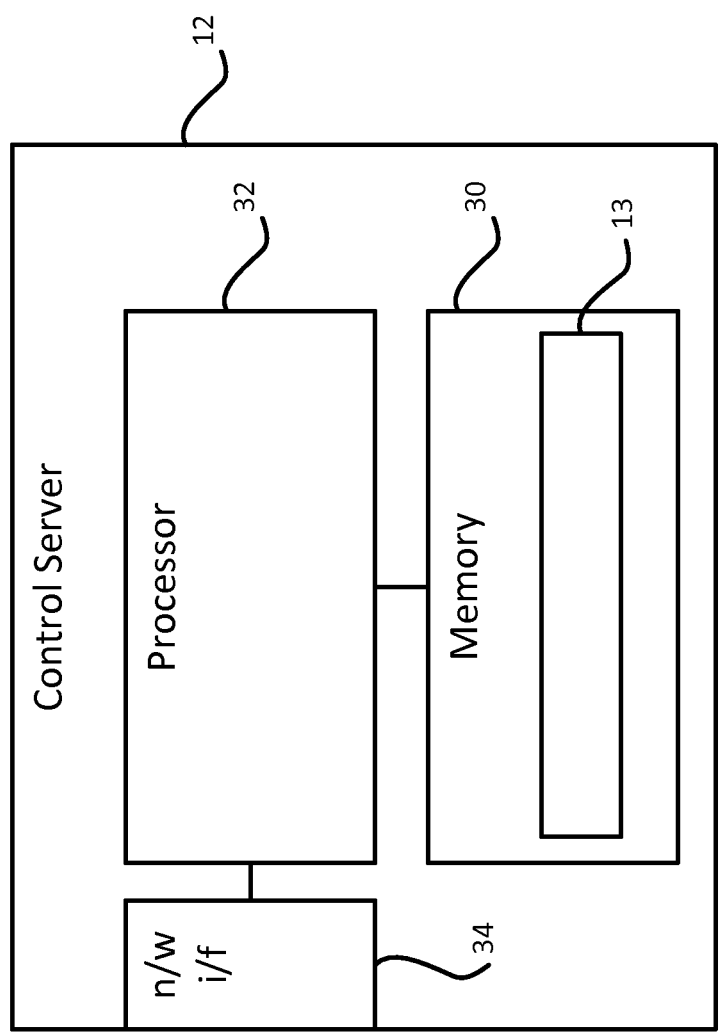
FIG. 3 shows a block diagram of a control server.

FIG. 3 is a schematic block diagram of the control server 12. The controller server 12 comprises a processor 32 to which is connected memory 30, and a network interface 24 which enables the control server 12 to connect to the network 1. The memory 30 holds the control software 13 which, when executed on the processor 32, causes the control server 12 to implement the functionality of the control software 13. Although depicted as a single device, the functionality of the control server 12 may be distributed across multiple server devices in a distributed fashion, or alternatively implemented by one or more user devices e.g. in a distributed, peer-to-peer fashion.

The network 1 has a layered architecture, whereby the functionality of the network 1 is organized into abstracted layers. This is illustrated schematically in FIG. 4. In this example, the network 1 implements the Internet protocol suite, whereby the functionality is organized into four layers 108-102: an application layer 108 (comparable to a combination of layers 5, 6 and 7 of the OSI ("Open Systems Interconnection") model), a transport layer 106 (comparable to layer 4 of the OSI model) below the application layer 108, a network layer 104 (comparable to layer 3 of the OSI model)—which is an internet layer—below the transport layer 106, and a link layer 102 (comparable to a combination of layers 1 and 2 of the OSI model) below the internet layer 104.

The application layer 108 provides process-to-process communication between processes running on different hosts i.e. general purpose computer devices connected to the network 1 such as user devices 6 and servers 12, 14 (note that routers 3 and NATs 8 are not "hosts" as the term is used herein). The transport layer 106 provides end-to-end communication between different hosts, including providing end-to-end channel(s) between hosts for use by the processes. The internet layer 104 provides routing i.e. communication between different individual networks of the internet 1, e.g. via routers 3/NATs 8 which operate at the internet layer, with the latter providing translation of network address information at the internet layer (network address translation). The link layer 102 provides communication between physical network addresses—for instance, MAC ("Medium Access Control") addresses—of adjacent nodes in same individual network the internet 1 e.g. via network switches and/or hubs etc. which operate at the link layer 102. Application data (e.g. user data) to be transmitted over the network 1 is passed at a transmitting host from the application layer 108 to the transport layer 106, at which it is packetized into transport layer packet(s) in accordance with a transport layer protocol such as UDP ("User Datagram Protocol") or TCP ("Transmission Control Protocol"). TCP is a "reliable" stream delivery service in that it involves acknowledgment/retransmission mechanisms whereas UDP is an "unreliable" stream delivery service in that it does not involve any such mechanisms. Packets of unreliable services are called datagrams. The data of the transport layer packet(s) (e.g. TCP packet(s)/UDP datagram(s)) are then passed to the internet layer 104 at that host, at which the data is further packetized into IP datagram(s) in accordance with the Internet Protocol (which is an internet layer protocol). The data of the IP datagram(s) are then passed to the link layer 102 for transmission over the network 1 to a receiving host. When received at the receiving host, the data of the IP datagram(s) is passed up to the internet layer 104, at which the data of the transport layer packet(s) is extracted from the payload(s) of the IP datagram(s) and passed up to the transport layer 106, at which the application data is extracted from the payload(s) of the transport layer packet(s) and passed up to the application layer.

Figure 4:
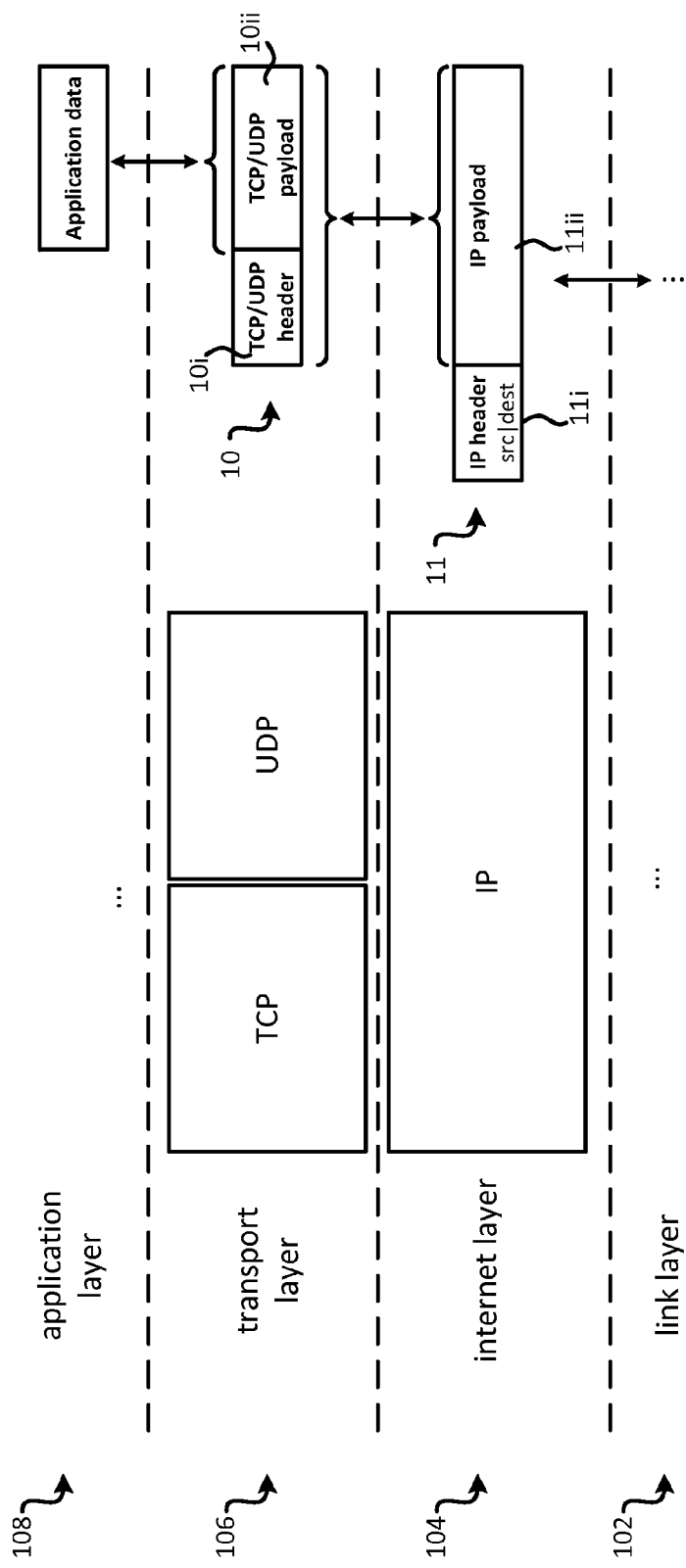
FIG. 4 shows a representation of a layered network architecture.

A transport layer packet (e.g. TCP packet or UDP datagram) 10 is illustrated in FIG. 4. The Transport layer packet 106 comprises a transport layer header (e.g. UDP/TCP header) 10i—which is generated and attached at the transport layer 106 of the transmitting host—and transport layer payload (e.g. UDP/TCP payload) 10ii—which encodes application data received from the Application layer 108.

An IP datagram 11 is also illustrated. The IP datagram 11 comprises an IP header 11i, which is generated and attached at the internet layer 104 of the transmitting host, and an IP payload 11ii, which encodes the data of the transport layer packet(s) received from the transport layer. The IP header comprises a destination transport address, which is a transport address to which the IP packet 11 is directed through the network 1, and a source transport address, which is a transport address local to the host (at least at this stage of packet generation) which generates the IP datagram.

The terms "IP header level" and "IP payload level" are used herein in reference to information encoded in IP header(s) and IP payload(s) respectively.

For packets generated within a private network (e.g. 5a/5b), the IP header includes a an IP address which is a private network address in the private address space of that private network (e.g. private network address of user device 6a/6b in 5a/5b); the transport layer header (e.g. UDP/TCP header) includes a port number of a port associated with that IP private address. Together, the IP address and associated port constitute a "transport address", which can be used to identify within the private network not just a particular device but, say, a specific application instance running on that device (e.g. communication client instance).

As indicated, such a private address space is not useable outside of that private network. As such, were a simple router used to forward IP datagrams between that private network (e.g. 5a/5b) and a public network (e.g. 2), nodes outside of that private network would be unable to respond to such datagrams as they would not have any useable source address in the IP header.

To this end, a NAT may be used to provide an interface between a public and private network.

Figure 5:
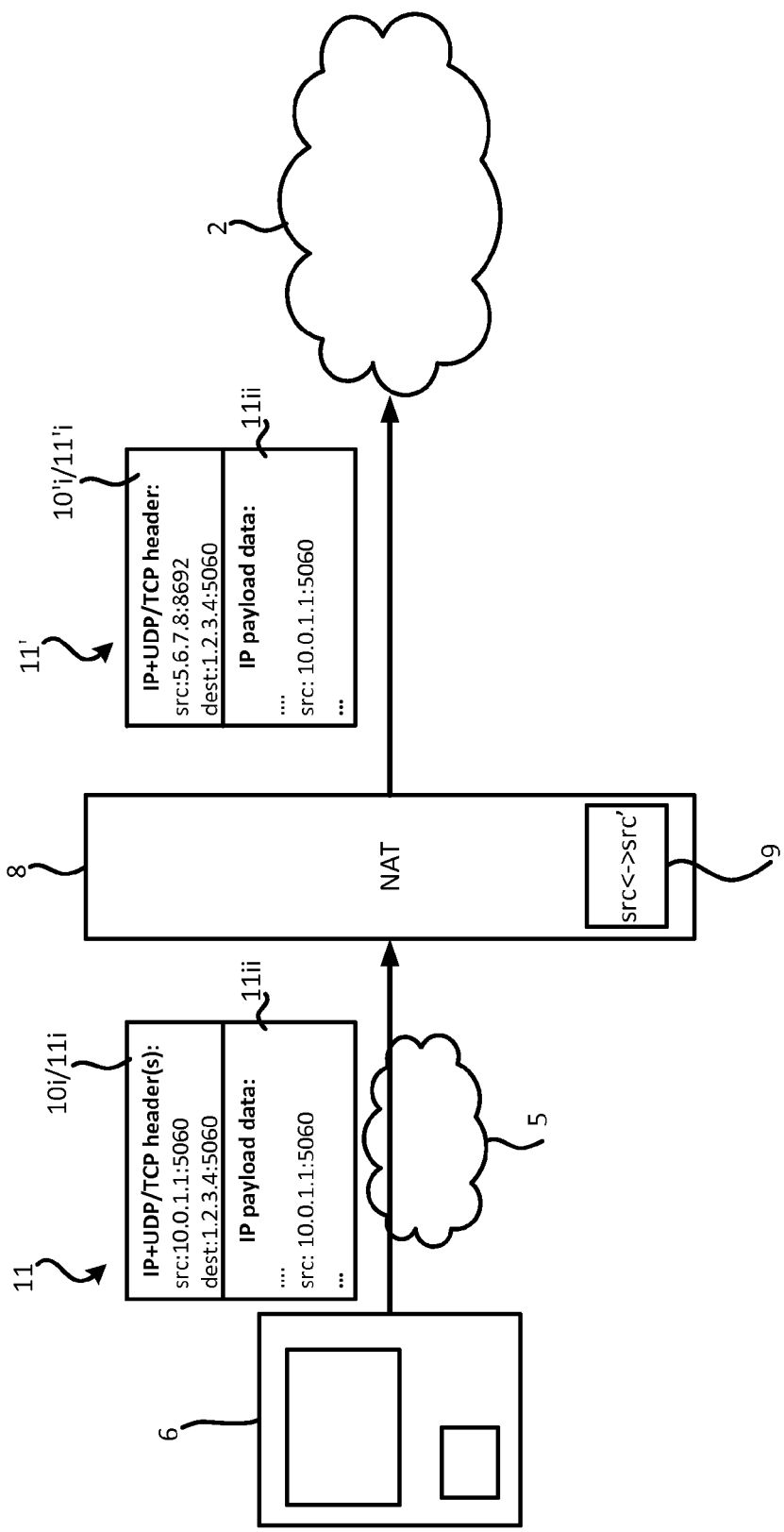
FIG. 5 illustrates operation of a Network Address Translator.

FIG. 5 illustrates the operation of a NAT 8 (e.g. 8a, 8b). IP datagrams 11 are received by the NAT via a private network 5 (e.g. 5a, 5b) from a node of that network such as a user device 6 (e.g. 6a/6'a, 6b/6'b). The IP and TCP/UDP headers 11i, 10i convey an initial source transport address of the user device 6, which comprises a private network address (which is a private IP address) of the user device 6 in the private address space of the private network 5 and a port associated with that private address. The IP and UDP/TCP headers 11i, 10i also convey a destination transport address to which the IP datagram 11 has been directed by the user device 6.

As shown, for each IP datagram, the NAT 8 modifies the IP and (in some cases) the TCP/UDP headers 11i, 10i to replace the initial source transport address with a new source transport address, thereby generating a modified IP datagram 11' with modified IP and (in some cases) TCP/UDP headers 11'i, 10'i conveying the new source transport address. The destination transport address and application data 17 are unmodified by the NAT 8. The new transport address is formed by a public network address (which is a public IP address) of the NAT 8 in the public address space of the public network 2, and a port associated with that public IP address.

The NAT 8 maintains a mapping 9 between the initial transport address and the new transport address so that it can forward any return traffic that has been directed to the new transport address via the public network 2 (and which will thus end up at the NAT 8) to the initial transport address of the user device 6 via the private network 5.

In the simplest example, the NAT simply replaces the private IP address with its own public IP network address and does not alter the port. However, it is becoming increasingly common for NATs to implement address space masquerading, whereby the private address space is hidden behind a single network address. To prevent ambiguity in return packets, the NAT generally has to alter other information such as the port associated with the source address. For instance, a NAT may have a single public IP address and replace every transport address in the private address space with its own single public IP address and a unique (and likely different) port so that outside of the private network nodes of the private network are distinguished from one another only by ports associated with that single public IP address.

Typically NATs do not modify the IP payload(s), but only modify the IP header(s) and (in some cases) the UDP/TCP headers in the above-described manner. This is generally acceptable for protocols (such as HTTP) which simply direct responses to the source address in the IP header.

However, others protocols including some media session protocols (such as SIP) also rely on address of endpoints encoded at the IP payload (not header) level. For example, the SIP protocol dictates that endpoints should use addresses which are contained in an SIP invite/SIP response to establish the media session, which will be encoded at the IP payload (not header) level. As illustrates in FIG. 5, this is not modified by the NAT 8.

Thus, for example, supposing the first user device 6a in FIG. 1 were to transmit a media session invite to the second user device 6b via the first NAT 8a encoded at the IP payload level. That NAT 8a would not modify the IP payload(s) thus, having received the invite, the second user device 6b would attempt to respond to the invite using the unmodified private transport of the first user device 6a from the unmodified IP payload(s) (not header)—this would fail as that private address is not useable outside of the private network 5a, and it would therefore not be possible to establish the session. Similarly, even if the first user device 6a were not behind the NAT 8a and instead had its own public IP address, the session establishment would still fail as the second user device 5b is behind the NAT 5b: in responding to the invite with a session invite response, the second user device 6b would include its own private address in the second address space of the second private network 5b in the response encoded at the IP payload level, which is similarly not useable by the first user device 6a.

To this end, protocols such as STUN ("Session Traversal Utilities for NAT") and TURN ("Traversal Using Relay NAT") have been developed to enable SIP sessions and the like to be established between endpoints which are separated by one or more NATs.

STUN allows an endpoint to determine whether or not it is located behind a NAT and, if so, the public address of the NAT which is mapped to the private address of the initiating endpoint (i.e. effectively giving it access to the mapping 9) so that the endpoint may include that public address in the IP payload(s) rather than its own private address. Typically, STUN works by the initiating endpoint sending a query to a STUN server, which is relayed to the STUN server through the NAT and via the public network as IP datagram(s). Because the NAT replaces the private address in the IP header(s) of the query with the corresponding public address on the public side of the NAT, the STUN server can obtain the latter from the IP header(s) of the query, which it can, in turn, provide to the initiating endpoint. The initiating endpoint can then established the session using that public address rather than its own private address, thereby conveying a useable address at the IP payload level to the responding endpoint in the session request. The responding endpoint can similarly discover its associated public address which it can convey to the initiating endpoint at the IP payload level in the response rather than its own private address. The role of the STUN server is effectively one of providing address discovery, and generally it does not participate in the media session once established.

As is known in the art, there are circumstances in which such a session cannot be established even when the public address of the NAT is known, for instance when the initiating and/or responding endpoint is behind a symmetric NAT. In such circumstances, one or more TURN relay servers can often be used to traverse the NAT by relaying media data through the TURN server(s).

When an endpoint needs to use a TURN relay, it sends a request to the TURN relay requesting that a unique public transport address on the TURN relay be allocated to the endpoint. If the request is accepted, the media session is then established using that public address of the TURN server as the source address for that endpoint. That endpoint sends to the TURN server media that it wishes to transmit in the session contained in TURN messages. The TURN server extracts the media from the TURN messages, and relays it onwards from the public address on the TURN server which has been allocated to that endpoint as a source address. The TURN server also relays data intended for that endpoint which has been directed to the address allocated on the TURN server to that endpoint contained in TURN messages for extraction by that endpoint.

If both endpoints are located behind NATs that do not permit STUN, then each will need its own respective transport address to be allocated on a TURN server, in which case the media session is established between those two allocated TURN server addresses and each endpoint relays/receives data in TURN messages, with data provided to the TURN servers being transmitted and received to/from the two TURN server addresses allocated to those endpoints in the media session.

TURN relaying requires resources—including the unique public transport address(es) allocated on the TURN server(s)—to be allocated on that (those) server(s) for at least the duration that media session, and also means that media of the media session travels via a less direct path than when a media session is established directly between the endpoints or via one or more NATs. Thus, whilst TURN relaying can more or less guarantee to provide a useable path through a network for a media session, this relaying comes at the cost of increased use of server resources and potentially increased latency due to the indirectness of the path.

STUN and TURN functionality can be incorporated in the same server, which is sometimes also referred simply to as a TURN server even though it also includes STUN functionality.

The media servers 14a and 14b of FIG. 1 are TURN servers, which incorporate both STUN and TURN functionality and thus have both address lookup and media relay functionality. Alternatively, this and/or other functionality may be split between separate servers, or the functions performed by the media servers 14a, 14b described below may be performed by the same server.

ICE ("Interactive Connectivity Establishment") is a known protocol that is used for establishing connectivity for VOIP sessions traversing network address NATs and firewalls, which attempts to establish the most efficient path in terms of media latency to ensure ideal media quality. Details of the ICE protocol can be found in the publically available RFC 5245, Interactive Connectivity Establishment (ICE): A Protocol for Network Address Translator (NAT) Traversal for Offer/Answer Protocols, J. Rosenberg (April 2010). Certain extensions to the ICE protocol are defined in [MS-ICE2] Interactive Connectivity Establishment (ICE) Extensions documentation (http://msdn.microsoft.com/en-us/library/office/cc431504(v=office.12).aspx).

In the context of ICE, a path with direct connectivity (direct path) between clients is preferred for a media session over an indirect path e.g. that involves using intermediate relay servers (e.g. relaying through TURN server(s)). A path in the context of ICE refers to a set of NAT(s) and/or media relay server(s) (if any: a path may include no NATs or servers) which can be used to transmit and receive data between those endpoints. As discussed below, a path is identified by a pair of transport addresses—one of which is used to transmit and receive data by an initiating endpoint and the other to transmit and receive data by a responding endpoint—which define such a set of NAT(s) and/or media relay server(s) (if any).

ICE permits only paths through a network which are symmetric. A symmetric path in this context means a path whereby data transmitted from a first endpoint to a second endpoint along that path traverses the same set of NAT(s) and/or media relay server(s) (if any) as data transmitted along that path from the second endpoint to the first endpoint, but in reverse order. Of course, there may well be asymmetry in terms of the route taken between endpoints and NATs, endpoints and servers, NATs and NATs, servers and servers, servers and NATs etc. e.g. for internet traffic, data may travel through different individual networks of the internet in each direction and/or at different times, and thus through different routers, but nevertheless passes through the same NAT(s) and/or TURN server(s) (if any) in both directions. A direct path which includes no servers or NATs is symmetric.

Figure 6A:
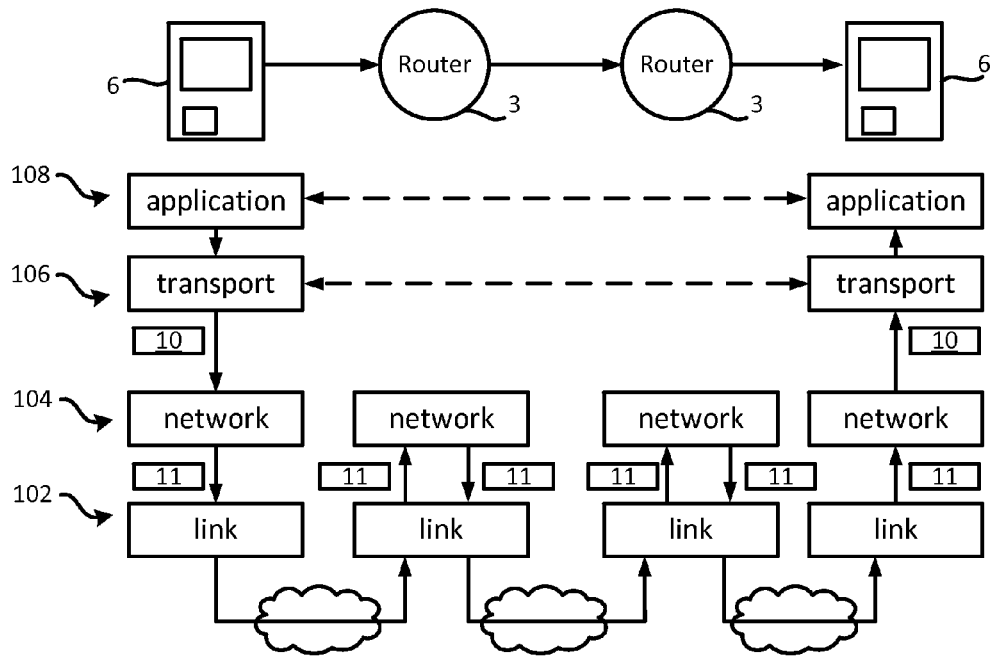
FIGS. 6A-C illustrate a first, second and third path through a network for a media session respectively.
Figure 6B:
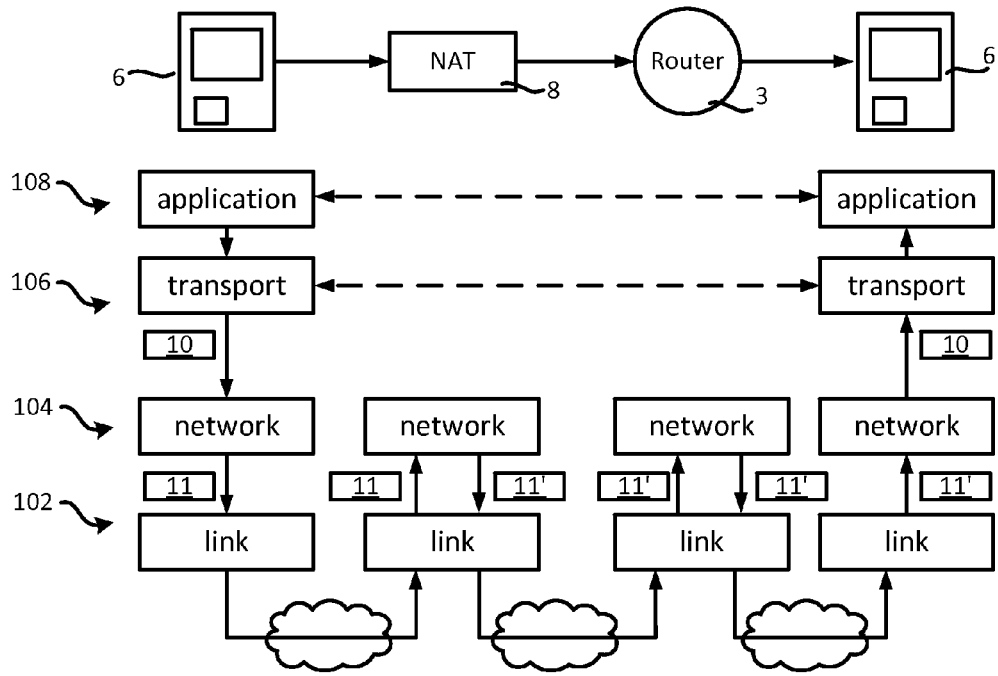

FIGS. 6A-6B show examples of paths through the network 1 of FIG. 1 which are symmetric and which are considered direct in the context of ICE.

FIG. 6A shows data intended for a receiving endpoint 6 (right hand side) travelling in one direction along a first path from a transmitting endpoint 6 (left hand side) to the receiving endpoint. The first path does not include any NATs 8 or relay servers 14. The path is symmetric in that data traveling in the other direction also does not go via any NATs 8 or relay servers 14, though it may go via different routers 3 in different directions and/or at different times.

As illustrated, once the data has been passed from the transport layer 106 as transport layer (e.g. UDP/TCP) packets 10 to the network layer 104 by the transmitting endpoint, it remains at or below the network layer 104 until reaching the receiving endpoint. That is, there is no transport layer (or higher) processing of the data whilst travelling along first path. IP packets 10 conveying the data may be fragmented along the way, but aside from that remain unmodified, and the transport layer packets 10 thus arrive at the transport layer of the receiving endpoint similarly unmodified.

FIG. 6B shows data intended for a receiving endpoint 6 (right hand side) travelling in one direction along a second path from a transmitting endpoint 6 (left hand side) to the receiving endpoint. The second path does include at least one NAT 8 but does not include any relay servers 14. The path is symmetric in that data traveling in the other direction goes via the same NAT(s) 8 (in reverse order) but no relay servers 14, though it may go via different routers 3, though the routers it traverses in either direction and/or at different times may be different.

Again, once the data has been passed from the transport layer 106 as transport layer (e.g. UDP/TCP) packets 10 to the network layer 104 at a transmitting endpoint, in this example it remains at or below the network layer 104 until reaching a receiving endpoint. In contrast to the first path of FIG. 6A, IP packets 11 conveying the data are modified at the NAT 8 to change the source address in the IP headers. In addition, in some cases, the TCP/UDP headers may also be modified to modify the port number, though this is not shown explicitly in FIG. 6B.

The modified IP packets are labelled 11' in FIG. 6B. Nevertheless, the IP payloads encoding the transport layer packets 10 are not modified and the transport layer packets 10 are therefore received at the transport layer of the receiving endpoint unmodified.

Figure 6C:
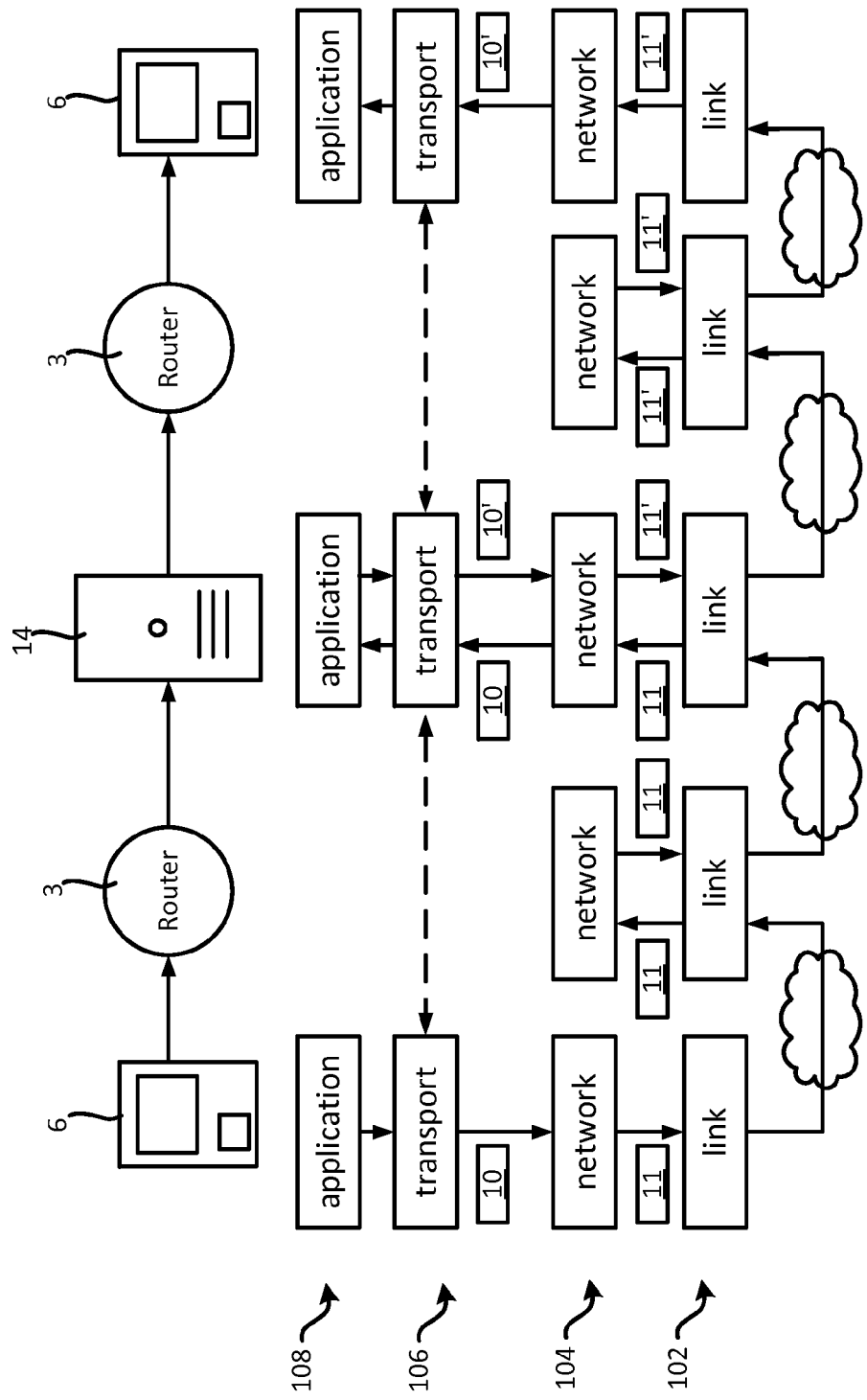

FIG. 6C shows an example of a symmetric indirect path through the network 1.

FIG. 6C shows data intended for a receiving endpoint 6 (right hand side) travelling in one direction along a third path from a transmitting endpoint 6 (left hand side) to the receiving endpoint. The third path does include at least one media relay server 14 and may also include one or more NAT(s) (not shown). The path is symmetric in that data traveling in the other direction goes via the same relay(s) and NAT(s) (in reverse order), but may go via different routers in different directions and/or at different times.

If the TURN server 14 shown in FIG. 6C is allocated to the transmitting endpoint 6 (left hand side), then the data is transmitted from the transmitting endpoint to the server 14 contained in TURN messages from which it is extracted and relayed on towards the receiving endpoint, otherwise if the TURN server is allocated to the receiving endpoint the data received from the transmitting endpoint at the relay server 14 is wrapped up into TURN messages for transmission toward the receiving endpoint. In either event, the TURN server operates at the transport and application layers to reformat the data when in transit of the third path which makes the third path indirect. Due to the reformatting, the receiving endpoint receives transport layer packets 10' which are different from those originally transmitted by the transmitting endpoint (10).

The ICE protocol attempts to identify what it deems to be the most efficient path based on static priorities, which are assigned to each of a number of so-called "candidate pairs" that could be used for the media session. A candidate is a transport address associated either an initiating endpoint or a responding endpoint. A candidate pair is a pair of candidates (i,r), the first (i) associated with the initiating endpoint and the second (r) with the responding endpoint. The term "candidate" relates to the fact that the ICE mechanism initially assumes that any transport address associated with an endpoint might be useable for a media session (though it may not actually be useable for reasons discussed above)—the ICE protocol then involves identifying candidate(s) which are actually useable.

ICE classes candidates into 3 categories: host candidates, reflexive candidates and relayed candidates.

A host candidate is a transport address which is local to the endpoint in question i.e. on a network interface directly attached to the endpoint. For example, the private addresses of the user devices 6a, 6b are local to those user devices and are thus host candidates, and similarly if the user devices were directly connected to the public network 2 (rather than or in addition to via the NATS 8a, 8b) they would have their own public addresses local to those user devices which would also be host addresses.

A reflexive candidate is a transport address which is not local to an endpoint, but which is a translated transport address on the public side of a NAT (e.g. as included in the modified IP header 11'i of FIG. 5). These are classed into two sub categories: "server reflexive candidates" which are public NAT addresses discovered by querying a server e.g. STUN server in the manner outlined above, and "peer reflexive candidates" which are discovered by the other endpoint during the establishment of the media session (e.g. a public side NAT address associated with the initiating endpoint as discovered by the responding endpoint, or vice versa).

A relayed candidate is a transport addresses allocated from a media relay server e.g. TURN server in the manner outlined above.

Figure 7:
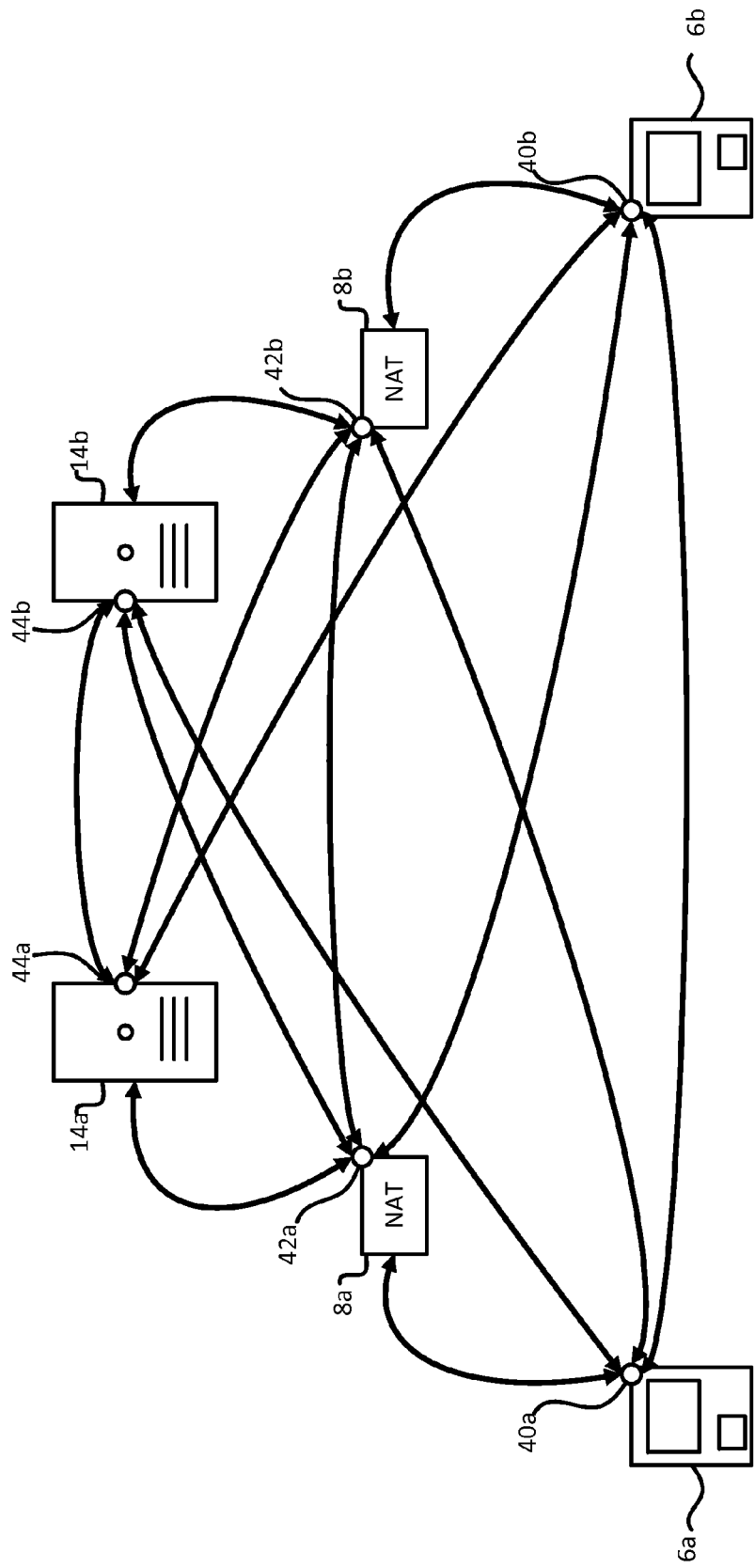
FIG. 7 illustrates a set of possible address pairings for a media session.

This is illustrated schematically in FIG. 7 for the first and second user devices 6a, 6b of FIG. 1. In this example, the first user device 6a is an initiating endpoint and the second user device 6b is a responding endpoint.

The first user device 6a is associated with a first local transport address (which is a host candidate) 40a; a first reflexive transport address (which is a reflexive candidate) 42a on the public side of the first NAT 8a and mapped to a private transport address of the first user device 6a in the first private network 5a; and a first relay transport address 44a (which is a relayed candidate) allocated to the first user device 6a on the first TURN server 14a. Similarly, the first user device 6b is associated with a second local transport address (which is a host candidate) 40b; a second reflexive transport address (which is a reflexive candidate) 42b on the public side of the second NAT 8b mapped to a private transport address of the second user device 6b in the second private network 5b; and a second relay transport address 44b (which is a relayed candidate) allocated to the second user device 6b on the second TURN server 14b.

Potentially, any of the initiating endpoint's candidate transport addresses can be used to communicate with any of the responding endpoint's candidate transport addresses. That is, the first user device 6a can potentially direct data from any of its own associated addresses (40a, 42a, 44a) to any of the addresses associated with the second user device (40b, 42b, 44b) and vice versa. In the example of FIG. 6, this results in nine candidate pairs that could potentially be used for communication between the first and second user devices 6a, 6b: [(40a, 40b),(40a,42b), . . . , (44a, 42b), (44a, 44b)].

However, in practice, some candidate pairs will not be valid (i.e. will not work). For instance, if the endpoints are both behind NATs and their host candidates 40a, 40b are private addresses in the private networks 5a/5b, they are unlikely to be able to communicate directly using those addresses 40a, 40b for the reasons discussed above. However, if their host candidates 40a, 40b are public addresses which, when used, do not involve routing data through any NATs then the candidate pair (40a, 40b) may well be valid.

Similarly depending on the type of NATs (e.g. if it is a symmetric NAT), use of reflexive candidates 42a and/or 42b may not be possible as discussed.

Each candidate pair thus potentially represents a path through the network of a certain type, although such a path will only be available in practice if the candidate pair is actually valid.

A pair of host candidates (e.g. (40a, 40b)) potentially represents a direct path through a network, which is a first direct path of the type described above with reference to FIG. 6A that does not involve any NATs or media relay servers.

However, such a candidate pair will be invalid if either of the local addresses 40a, 40b is a private address, usage of which in fact involves sending data via a NAT.

A pair of candidates, at least one of which is a reflexive candidate, (e.g. (40a, 42b), (42a, 40b), (42a, 42b)) potentially represents a direct path through the network, which is a second direct path of the type described above with reference to FIG. 6B that does involve NAT(s) but no media relay servers. However, such a candidate pair will be invalid if (either of) the reflexive address(es) is on the public side of e.g. a symmetric NAT.

A pair of candidates, at least one of which is a relayed candidate, (e.g. (40a, 44b), (42a, 44b), (44a, 44b), (44a, 42b), (44a, 40b)) represents an indirect path through the network of the type described above with reference to FIG. 6C which is likely to work but at the expense of requiring resource allocation on a media relay server(s).

As part of an ICE media session establishment procedure, both the initiating endpoint and the responding endpoint attempt to discover all their candidates by communicating with an appropriate TURN server (e.g. 14a, 14b), which are then paired in all possible combinations—e.g. if the six candidates 40a, 44b were discovered, this would result in the nine candidate pairs discussed above. ICE then attempts to discover which candidate pairs are valid. The way that ICE does this is to systematically try all possible pairs in a specific sorted order until it finds a set of one or more valid (i.e. working) candidate pairs, one of which can then be selected for the media session. Whenever at least one of the endpoints discovers more than one candidate giving rise to multiple candidate pairs, there will be a plurality of potentially available paths through the network via which the media session could be established (though not all of them may actually be available as not every candidate pair is valid).

The order in which candidate pairs are tried is dictated by the ICE static priority scheme, with higher priority pairs being tried ahead of lower priority pairs.

In accordance with the ICE protocol, each candidate (e.g. 40a-44b) can be assigned a static priority in accordance with equation 1:

$$\text{priority} = (2^{24})*(\text{type preference}) + (2^{8})*(\text{local preference}) + (2^{0})*(256 - \text{component ID})$$

The type preference (one example of a type metric) is an integer from 0 to 126 inclusive, and represents the preference for the type of the candidate (local, server reflexive, peer reflexive, and relayed). 126 is the highest preference, and a 0 is the lowest. Setting the value to a 0 means that candidates of this type will only be used as a last resort. The type preference is identical for all candidates of the same type and is different for candidates of different types. The type preference for peer reflexive candidates is higher than that of server reflexive candidates. The ICE protocol recommends values of 126 for host candidates (unless these are from a Virtual Private Network interface, in which case 0 is recommended), 100 for server reflexive candidates, 110 for peer reflexive candidates, and 0 for relayed candidates. The local preference is an integer from 0 to 65535 inclusive and represents a preference for the particular IP address from which the candidate was obtained when an endpoint is multihomed (connected to more than one computer network). When there is only a single IP address, ICE recommends setting this to the maximum of 65535, effectively making this term redundant when there is no multihoming. The component ID term is an identifier of the candidate.

As can be seen, by far the most significant term in equation 1 is the first term which is based on the candidate type.

Thus the ICE priority scheme deprioritizes indirect paths via relayed candidates, which it uses only as a last resort, and moreover biases the static priorities away from reflexive candidates.

Once the candidate pairs are formed and priorities assigned in accordance with equation (1), candidate pair static priorities for each candidate pair can be calculated in accordance with equation 2:

$$\text{pair priority} = 2^{32}*\text{MIN}(G,D) + 2*\text{MAX}(G,D) + (G>D?1:0)$$

where G is the static priority for the initiating endpoint's candidate, D that for the responding endpoint's candidate, and G>D?1:0 an expression whose value is 1 if G is greater than D, and 0 otherwise.

Because ICE deprioritizes relayed candidates as compared with to non-relayed candidates, candidate pairs which include a relayed candidate are deprioritized as compared with those that do not. Thus, the ICE static priority scheme prioritizes more direct paths over less direct paths.

In addition, because ICE deprioritizes reflexive candidates as compared with host candidates, candidate pairs which include a reflexive candidate are deprioritized as compared with those that only comprise host candidates. Thus, the ICE static priority scheme is biased towards routes that do not involve NATs.

The static ICE path prioritization schemes is generally sufficient for controlled corporate deployments/topologies. However large scale global online service deployments of real time media services brings along a completely different set of challenges for which the static priority scheme may not only be insufficient but also be detrimental in certain cases. Finding the ideal connectivity path in a particular set of circumstances becomes critical to ensure the best possible experience for users and also to ensure media quality SLAs ("Service Level Agreements") for users subscribing to online services can be met.

Certain embodiments of the present subject matter reduce the number of candidates and candidate pairs. Probing a candidate pair requires sending connectivity check packets (probe message(s)) which uses bandwidth. Bandwidth utilization is aggressively reduced for call establishment by reducing the number of candidates, and as a result the number of candidate pairs, available.

Even with the reduced candidate pairs, a further optimization can be attained by disabling paths (i.e. candidate pairs) that are unlikely to work based on topology knowledge known statically (e.g. if it is known that an endpoint is configured as a publicly reachable conference server, for example) and/or information learned dynamically (e.g. detecting that both clients are behind a NAT). Alternatively or in addition, bandwidth can, in embodiments of the present subject matter, be saved by reducing restricting the number of probe messages (i.e. the number of retries) based on such information, wherein the candidate pair is determined to be invalid if no replies are received in response to the restricted number of probe messages; and/or by modifying the ordering of connectivity checks with respect tot eh ICE protocol, to de-prioritize candidates less likely to work, based on such information.

In this respect, the present disclosure recognizes that TURN-TURN paths provide the most reliability but are the most expensive since all traffic will need to flow through deployed TURN servers. In a practice context, relating every media stream via a TURN server would be impracticable and prohibitively expensive. That is, TURN servers should be viewed as a limited network resource.

Moreover, the present disclosure recognizes that probing each candidate pair comes with a bandwidth utilization cost, which increases depending on how many attempts are made to validate that pair in the connectivity checks due to the increased number of probe messages.

An aim of the described embodiments is improving reliability parity in terms of calls being successfully established with the described optimizations.

Figure 8:
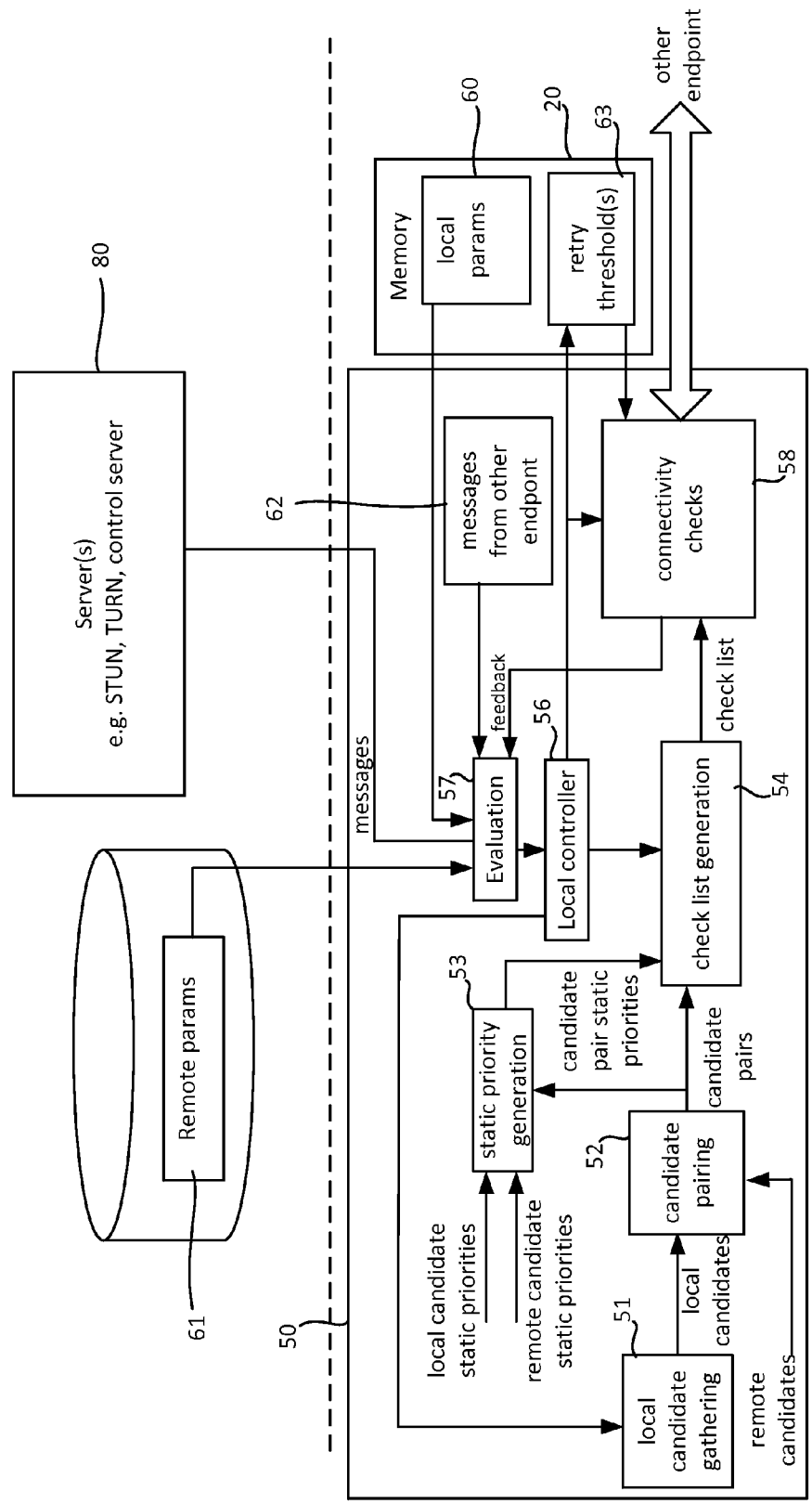
FIG. 8 shows a function block diagram representing functionally of an endpoint(s) and a control server.

FIG. 8 is a function block diagram, in which functional blocks (components) below the dashed line in FIG. 8 represent functionality implemented by a client 7 (7a and/or 7b—in this example, each client implements the described functionality separately) when executed on a user device 6 (6a and/or 6b). Components above the dotted line represent "back-end" functionality implemented by the control code 13 when executed on the control server 12, or the TURN/STUN servers 14a, 14b.

The client 7a implements a path selection system 50 which comprises a local candidate gathering component 51, a candidate pair generation component 52, a static priority generation component 53, a check list generation component 54, a local controller 56, an evaluation component 57, and a connectivity check component 58.

Note that FIG. 8 is highly schematic. The blocks represent at a high-level certain software components of the client 7a. The arrows high level interactions between them and do not denote any specific arrangement of physical or logical connections.

The local controller 56 and evaluation component 57 denote functionality that is implemented in accordance with certain embodiments of the present subject matter. In particular the evaluation component 57 determines whether one or more of a set of predetermined "modified connectivity check" criteria applies, the nature of which is described in detail below. In this respect, the evaluation component 57 analyses locally stored parameters 60, remotely stored parameters 61 access via the network(s) 2 and/or 8a and/or 8b, and electric messages received form the server(s) 80 and/or electronic messages 62 received from the other endpoint, as well as feedback from the connectivity checks component 58 regarding the progress and current status of the connectivity checks whilst they are performed.

The local controller 56 receives results of this analysis from the evaluation component 57, and uses the received result to control the operation of: (i) the local candidate gathering component 51, and/or (ii) the check list generation component 54, and/or (iii) the connectivity checks component 54, by setting one or more retry thresholds (probe message thresholds) 63 in the memory 20 that are accessible to the connectivity checks component 58 and which it used to perform the connectivity checks.

For example, each candidate pair may have a respective associated probe message threshold 63 implemented in the memory 20, and one or more of the associated thresholds 63 may be adapted accordingly. Once a the number of probe messages transmitted for a given candidate pair reaches the maximum define it its threshold (or if the threshold is reduced during the connectivity checks themselves, such that by the time it is reduced more than the reduced maximum number of probe messages have already been transmitted for that pair), ad determined by comparing the number of transmitted messages with the corresponding threshold, that candidate pair is removed from the check list, thereby preventing any more probe messages being sent for that candidate pair.

If at least one of these criteria is determined to apply by the evaluation component 57, then the local controller 58 causes the connectivity checks implemented by the connectivity check component 58 to be modified, relative to the connectivity checks that would have been performed had none of the criteria been determined to apply given the candidates that are available to the endpoints.

That is, in a situation in which a respective set of one or more candidates is available to each of the endpoints, if none of the modified connective criteria applies, connectivity checks proceed in a certain way based on these available sets. By contrast, in a situation in which exactly the same sets of candidates are available to the endpoints but at least one of the modified connected check criteria does apply, the connectivity checks proceed differently as a result, for example:

1. with fewer candidate pairs;
2. with fewer retries for certain candidate pairs; and/or
3. in a different order (with different priorities).

In the context of 1 and 2, modified connectivity check criteria are referred to herein as "reduced connectivity check criteria".

Note that "available" candidates in this context does not necessarily mean gathered candidates—an available candidate may be one which is available to the endpoint but not yet gathers (i.e. that the endpoint is capable of gathering).

Thus the manner in which the connectivity checks are performed depends not only on the candidates that are available to the endpoints, but also on whether or not any of the predetermined reduced connectivity check criteria is determined to apply.

For example, if none of the criteria is determined to apply, the available sets of candidates are paired, and connectivity checks may performed for every possible pairing of the available in accordance with the ICE protocol (that is, strictly adhering to the rules laid down by the ICE protocol). By contrast, if the same candidates are available but at least one of the criteria does apply, at least one pairing of the available candidates, which the ICE protocol indicates should be checked, may not checked; and/or the order in which candidate pairs are checked may deviate form that specified by the ICE protocols in view of their static priorities.

Figure 9:
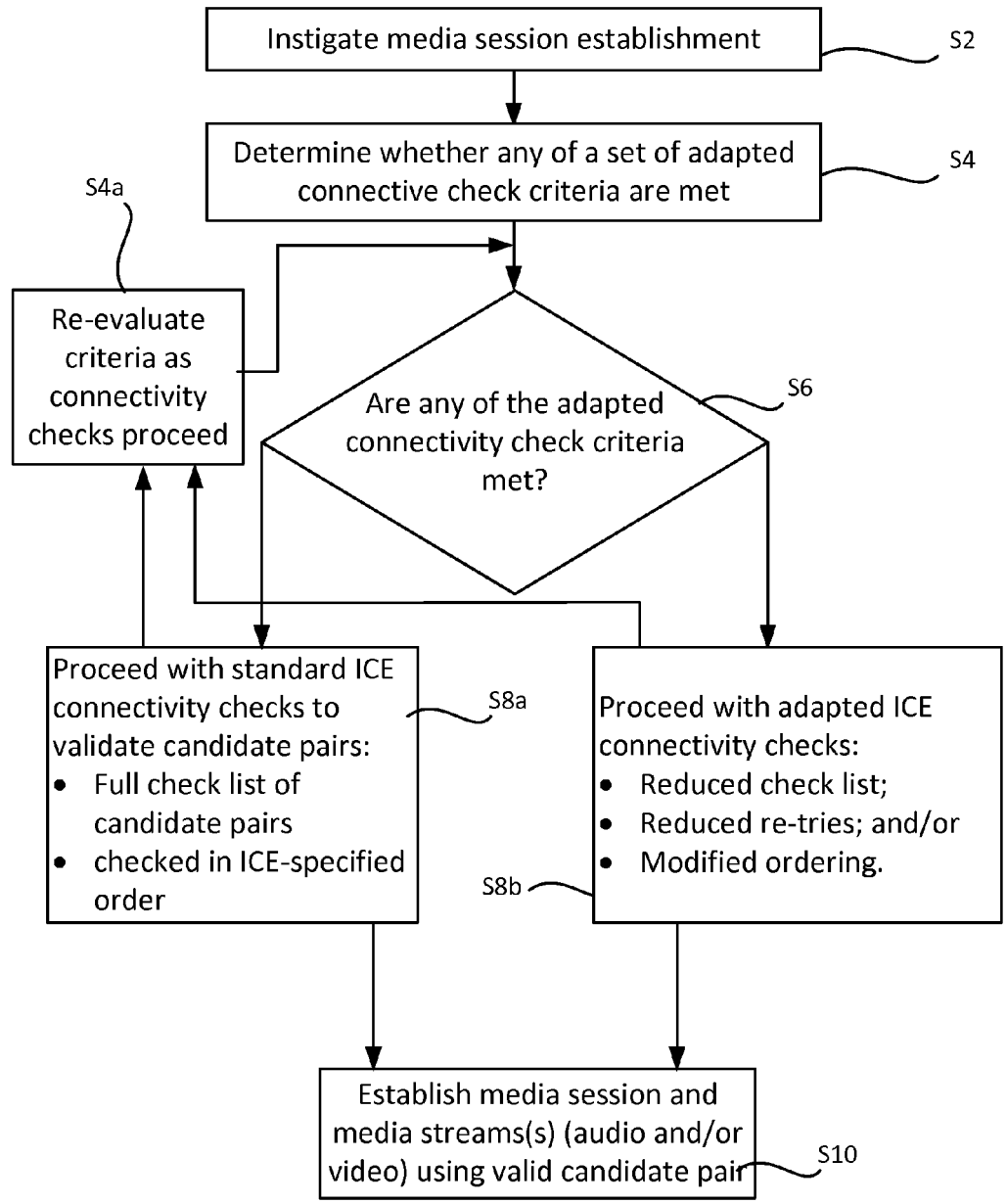
FIG. 9 is a flow chart for a method of establishing a media session.

FIG. 9 shows a flowchart for a media establishment process. The method is a computer-implemented method, which in this example is implemented separately by each of the clients 7a, 7b.

At step S2, the media session establishment process is instigated, for example, at the caller endpoint 6b, in response to a call instigation input from the user; or at the callee endpoint 6b, in response to a call request message received from the caller endpoint 6a.

At step S4, the evaluation component 57 determines whether any of the set of one or more modified connectivity check criteria is met. For example, this determination may comprise at least one of the following:

- determining whether either or both of the endpoints 6a, 6b is located behind a firewall or NAT.
- determining a current operational configuration of at least one of the endpoints—e.g. whilst in the above examples the endpoints are user devices, in other scenarios at least one may be a server, and this or related operational information may be determined at step S4. More specific information may be determined at step S4, for example it may be determined not only that the endpoint is operating a server, but that it is currently publically accessible on the public Internet 2.
- determining a historical usage metric for at least one candidate pair. The historical usage metric may, for example, be defined in relation to the type of the pair—e.g. the historical usage metric may be defined based on historical usage of that type of candidate pair (not necessarily candidate pair individually) across the relevant local network 5a/5b, for example historical usage of (reflexive, *) candidate pairs may be low in the case of, say, the local network 5a if the NAT 8a is symmetric, which may be determined at step S4. To this end, historical usage data pertaining to the local networks 8a/8b may be stored centrally in those networks, or in the public Internet 2.
- determining one or more current network conditions, such as a current bandwidth(s) available to one or both of the endpoints 7a, 7b. The available bandwidths may be constrained, particularly in the case that the local networks 8a/8b are or comprise cellular networks.

As indicated in FIG. 8, each of these determination made may be based a respective on one or more of the following:
1. one or more local parameters 60 stored in the endpoint's local memory 60;
2. one or more remote parameters 61 held in a remote memory location, such as a database;
3. one or more messages received from a server(s), e.g. control server 12 and/or STUN/TURN server 14;
4. one or more messages 62 received from the other endpoint.

For example, parameters 60/61 may identify whether or not an endpoint is a public Internet server. As another example, messages received from A STUN/TURN server may be used to determine whether or not an endpoint is behind a firewall or NAT i.e. based on an active detection procedure instigated by the endpoint, or the control server 12 may push messages to the endpoint to convey relevant information to it.

Based on one or more of these determinations, it is determined whether any of the modified connectivity check criteria is met, for example:
- one or more network topology criteria pertaining to at least one of the endpoints, for example:
  - at least one network topology criterion that is met only if at least one of the endpoints is behind a firewall or network address translator, e.g.:
    - only if one of the endpoints is configured to operate as a server and is behind a firewall or network address translator ("first network topology criterion");
    - only if both of the endpoints are behind respective firewalls or network address translators ("second network topology criterion");
    - a third network topology criterion that is met if there is, say, both a (direct, TURN) path and a (TURN, direct) path, where "direct" in this contact denotes reflexive or host;
    - a third second network topology criterion that is met only if one of the endpoints is configured to operate as a publically reachable server of the public Internet;
  - at least one network topology criterion that is met only if at least one candidate pair is a (relay, direct) candidate pair, where "direct" denotes host or reflexive, i.e. where the candidate of that pair for the endpoint carrying out the method is a relay candidate and the candidate of that pair for the other endpoint is a direct candidate, e.g.
    - only if there is the at least one (relay, direct) candidate pair and at least one (direct, relay) candidate pair, i.e. where the candidate of the network carrying out the method is a direct candidate and the candidate of the other endpoint is a relay candidate ("fourth network topology criterion").
- at least one historical network usage criterion pertaining to at least one of the candidate pairs, for example:
  - a first historical network usage criterion that is met only if the historical usage metric is below a historical usage threshold ("first historical network usage criterion");
- at least one network capability criterion, e.g. network preferences criterion, pertaining to the networking capabilities of at least one of the endpoints, for example:
  - a first network capability criterion that is met only if both of the endpoints are capable of operating according to a preferred one of the network protocols, such as one of UDP or TCP and/or one of IPv4 and IPv6.
- at least one network conditions criterion pertaining to the networking conditions experienced by at least one of the endpoints, for example:
  - a first network conditions criterion that is met if at least one of the endpoints is connected to the network by a connection having an available bandwidth below a bandwidth threshold. That is, a restricted bandwidth criterion;
- at least one connectivity check progress criterion pertaining to the connectivity checks, which is evaluated at least once by the first endpoint during the connectivity checks. In this case, the connectivity checks may be adapted as they are being performed, in response to such a criteria becoming met, or; for example:
  - a first connectivity check progress criterion that becomes met only when at least one other candidate pair has been determined to be valid by connectivity checks.

Note that the above are non-exhaustive examples. Moreover, as discussed below, the evaluation of the criteria is not limited to a pre-evaluation taking place before connectivity checks commence e.g. a connectivity check modification criterion may only become satisfied during connectivity checks, and connectivity checks only modified after that in response. An example is reducing the extent to which the remainder of the connectivity checks is performed once a valid candidate has been found (see below).

At step S6, the process branches depending on whether or not any of the modified connectivity check criteria has been determined to be met at step S4. If none has, unmodified (full) connectivity checks are performed as part of step S8a, for example adhering to all of the rules laid down by the ICE protocol as defined in MS-ICE2. If at least one has, modified connectivity checks (e.g. reduced and/or reordered connectivity check are performed instead as part of step S8b. Steps S8a and S8bconstitute respectively unmodified (full) and modified (e.g. reduced) candidate gathering, pairing and connectivity check procedures.

As indicated by process step S4a, whilst the connectivity checks S8a, S8b are being performed i.e. the modified connectivity criteria may be repeatedly (e.g. continuously) re-evaluated. In this respect, in addition or as an alternative to the examples given above, the modified connectivity check criteria may comprise at least one of the following:

one or more connectivity progress criteria, for example:
a first connectivity progress criterion, which is met only when at least one candidate pairs has been determined to be valid by the connectivity checks As is evident, this criterion will never be satisfied before connectivity checks commence, but may become satisfied during connectivity checks. Note this may not be the only criteria that is repeatedly reevaluates—any one or more of the above mentioned criteria may be repeatedly revaluated alternatively or in addition. For example, bandwidth may be repeatedly monitored.

In this respect at step S4a the connectivity checks of S8a or S8b (as applicable) are monitored by the evaluation component 57 as they progress, to determine if and when one or more criteria which may not have been met at the start of the connectivity checks become met during them, e.g. as a consequence of connectivity checks; for example it may be determined at step S4a whether at least one candidate pair has been determined to be valid yet by the connectivity checks, and/or whether any of the criteria listed above in relation to step S4, that was not met at the start of the checks of S8a, S8b, has become met since.

In the case that unmodified connectivity checks S8a are performed initially, when at least one of the criteria becomes met, the process switched to modified connectivity checks S8b. Moreover, even if modified connectivity checks S8b are performed initially, should there be any changes in which criteria are met (e.g. a new criteria is met), the connectivity checks may be modified further—e.g. reduced connectivity checks instigated with a reduced number of candidate pairs may be modified further when a candidate pair is determined to be valid, for example by reducing a retry threshold(s) for at least one the remaining candidate pair(s) (see below).

The unmodified or reduced connectivity checks S8a, S8b terminate when the stopping condition is met, e.g. when the highest priority candidate pair has been validated or after a timeout i.e. upon reaching the end of a predetermined connectivity check duration.

At step S10, a media session is established using a candidate pair determined to be valid by the connectivity checks; that is, a candidate pair from a "valid list" generated in the connectivity checks (see below), which may or may not be the only candidate pair found to be valid. Where only one valid candidate pair is found in the connectivity checks, that candidate is used to establish the media session; if there are multiple candidate pairs revealed, then one is selected and used to establish the media session. For example, the highest priority candidate pair in the valid list may be selected for the media session.

Figure 10:
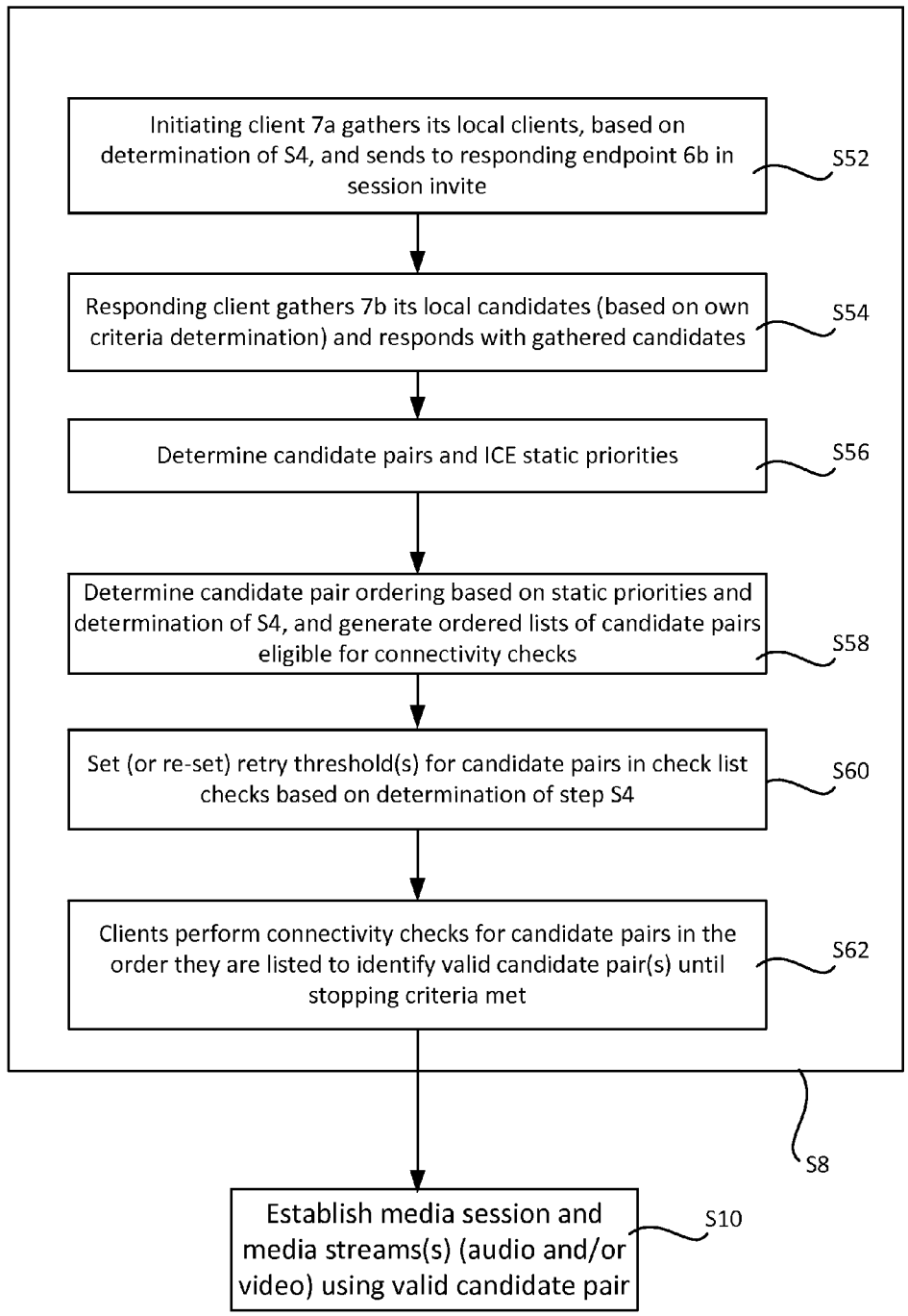
FIG. 10 is a flow chart for a connectivity checks procedure.

FIG. 10 is a flowchart certain individual steps of a candidate gathering, pairing and connectivity check procedure S8. The flowchart applies to both the unmodified and reduced procedures S8a, S8b, though one or more of the individual steps is performed differently depending on which is performed as set out below.

At step S52, the local candidate gathering component 51 of the client 7a on the initiating endpoint 6a (initiating client) communicates with the first TURN server 14a to discover its candidates (local candidates) i.e. any host, server reflexive and relayed candidates which it might be able to use for the media session. The initiating client then transmits these to the responding endpoint 6b in a session invite message. In response (S54), the client 7b on the responding endpoint 6b (responding client) gathers it candidates (remote candidates) by communicating with the second TURN server 14b which it returns to the initiating endpoint.

In the unmodified procedure S8a, both of the endpoints attempt to gather every possible candidate i.e. it attempt to gather all three of local, reflexive and relay candidates—the latter two consume bandwidth as they require signalling with, say, a STUN and TURN server respectively.

In some cases, in the modified procedure S8b, the number of candidates gathered is reduced in step S45 relative to the unmodified process S8b, based on the determination(s) of step S4. For example, reflexive and/or relay candidates may not be gathered by one or both of the endpoints 6a, 6b, which reduces signalling and therefore saves bandwidth in itself. Moreover, this will reduce the number of candidate pairs that is checked, leading to a second bandwidth saving in the connectivity checks relative to the full procedure S8a.

That is, one or both of the endpoints may reduce the number of candidates they offer. For example, if one of the endpoints 6a, 6b is determined to be a server that is publicly reachable (i.e. on the network 2, such as the Internet), it will not gather relay candidates. This will reduce the number of candidate pairs that client will need to setup and probe, thus saving bandwidth.

At S56, the candidate pair generation component 52 receives both the local candidates and the remote candidates as discover by the initiating and responding endpoint respectively, from which it generates and outputs a set of candidate pairs. The candidate pair generation component 53 receives the generated set of candidate pairs as well as ICE static priorities assigned to the local and remote candidates, and generates based on the three inputs static priorities for the candidate pairs. Both endpoints may perform the same candidate pair/priority adjustment processes in parallel, or one endpoint may perform these and communicate the results to the other.

Each of the candidate pairs potentially corresponds to an available path through the network which might be used by the endpoints for the media session if that candidate pair turns out to be valid.

At step S58 the check list generation component generates a "check list". The check list is an ordered list of candidate pairs which determines the order in which connectivity checks are performed.

In the unmodified procedure S8a, the checklist is computed in accordance with the ICE protocol i.e. it is a full list of all possible candidate pairs (i.e. all candidate pairs which ICE dictates are possible), ordered strictly by static priority.

In the modified procedure S8a, the checklist may omit at least one candidate pair relative to the full set. This may be a consequence of excluding certain candidate(s) in the gathering step S54, or one or more pairings of the gathered candidates may be explicitly excluded from the check list at step S58.

As a first example, paths may be "pruned" (that is, disabled), i.e., candidate pairs may be excluded from the check list and hence connectivity checks) based on topology knowledge. E.g.: if it was determined at step S4 that the peer is server behind a firewall it will not be directly reachable and the paths can be disabled without even attempting them.

As a second example, TURN candidates provide maximum connectivity; if both endpoints have TURN-TURN e.g. UDP candidates pairs then all TCP candidate pairs can be disabled. That is, if there is a e.g. UDP (relay, relay) pairing of gathered candidates, this is added to the check list and all TCP candidate pairing are excluded form the check list. UDP is typically the preferred protocol for real time media; however, if TCP is preferred then UDP candidate pairs can be similarly disabled for that scenario.

As a third example, depending on whether IPV4 or IPV6 is preferred the non-preferred version of candidate pairs can be completed disabled. That is either all IPv4 or IPv6 candidate pairs may be excluded from the check list, depending on which is preferred.

Alternatively or in addition, paths that are unlikely to be valid may be dropped further down the check list (i.e. deprioritized) so that other candidate pairs are checked first. In this case, the ordering of the check list deviates form that specified by ICE.

Alternatively or in addition, paths that are unlikely to work are in some cases disabled after a reduced number of retries to conserve bandwidth.

For example, if both the caller and callee endpoints are behind NATs, it is unlikely that the endpoints will have direct connectivity to each other using their host candidates. This path can be pruned, i.e. removed from the check list after, a few retries i.e. limited number of retires, i.e. fewer retries relative to the full procedure s8a. In this respect, at step S60, the endpoint sets one or more retry thresholds, each for one or more of the candidate pairs in the check list; alternatively or in addition, the (host, host) candidate pair may be dropped down the list, or alternatively excluded from the check list all together in that event.

Note that elements of step S60 may in fact be performed whilst connectivity checks (s62) are ongoing, as indicated above. For example, once a valid path is found by connectivity checks, the maximum number of retries for all candidate pairs may be reduced. This allows the endpoint's state machine to complete faster and reduces bandwidth. This threshold for retries is picked to balance between reliability and bandwidth utilization.

As another example, the ordering of the check list may be changed at step S58 (relative to the full process S8a) so as to preferably probe direct-TURN paths and/or putting TURN-Direct paths on reduced retries at step S58 relative to the full process S8a.

Probing TURN-Direct paths is more expensive than Direct-Turn paths even though both paths provide similar quality. Hence by favouring the latter, bandwidth can be saved without any significant impact on quality.

Alternatively or in addition, candidate pairs may be set to reduced retries and/or dropped down the check list, or excluded from the check list all together based on historical usage—e.g. a candidate pair of a particular type where historical usage of that type of candidate pair, say, within the network 8a and/or 8b is low.

Alternatively or in addition, candidate pairs may be set to reduced retries and/or dropped down the check list, or excluded from the check list altogether based on currently available bandwidth e.g. where the bandwidth is limited i.e. below the bandwidth threshold.

These various techniques fast dynamic pruning of unreachable paths to reduce bandwidth utilization, while still give paths a reasonable chance to succeed.

At S6s, the clients 7a, 7b perform connectivity checks. Connectivity checks are performed for individual candidate pairs in the check list in the order in which they appear in the check list, starting with the pair at the top of the list. The connectivity checks continue until a stopping criterial is met e.g. until a certain number (one or more) of candidate pairs (e.g. the highest priority pair) is determined to be valid and/or after a predetermined amount of time has elapsed. For so-called "aggressive nomination", connectivity checks end when the first valid candidate is found; "regular nomination" however allows connectivity checks to continue to attempt to find more than one valid candidate pair (if desired). At the end of the connectivity checks, a list of the one or more candidates determined to be valid is generated (valid list).

As indicated, some (possibly many) of the candidate pairs may fail the connectivity checks e.g. a candidate pair which includes a host candidate which is a private transport address is likely to fail for reasons discussed.

Note that certain exemplary situation are described above and below, in which a certain connectivity check modification criterion, when met, causes one of: a reduction in the size of the candidate pair set, a reduction in the probe message threshold (retry threshold), or a reordering of the candidate repair set (to drop a candidate pair down the check list). For the avoidance of doubt, it should be noted that:

for any example disclosed herein above or below, in which the response to the criterion being met is excluding a candidate pair from connectivity checks, alternatively or in addition the probe message threshold for that candidate pair(s) may be reduced and/or that candidate pair may be dropped down the ordering, i.e. so as to cause connectivity checks for that candidate pair to be performed later, relative to the first candidate pair in the candidate pair set;

for any example disclosed herein above or below, in which the response to the criterion being met is reducing the probe message threshold for that candidate pair(s), alternatively or in addition that candidate pair may be dropped down the ordering; or alternatively that candidate pair may be excluded from connectivity checks altogether;

for any example disclosed herein above or below, in which the response to the criterion being met is reducing dropping that candidate pair down the ordering, alternatively or in addition the probe message threshold for that candidate pair may be dropped down the ordering; or alternatively that candidate pair may be excluded from connectivity checks altogether.

Herein, the terms "first endpoint" and "second endpoint" are used, either of which can be the initiating or responding endpoint. That is, the techniques of the present disclosure can be implemented at either the initiating endpoint, the responding endpoint or at both. In the context of this disclosure, the "first" candidate network address of a candidate pair is a network address available for use by the endpoint performing the method (first endpoint), whereas the "second" candidate network address is a network address available for use by the second endpoint.

In various embodiments, the candidate sets may be reduced at both of the endpoints 6a, 6b, which results in a further reduction of the total number of candidate pairs (relative to candidate reduction at just one of the endpoints). Moreover, additional methods can be uses for candidate reductions e.g. based on the candidate sets that the first endpoint selects and communicates to the second endpoint, the second endpoint can use that information to further reduce its own candidate sets e.g. if only TCP candidates (or UDP) candidates are offered by the first endpoint then the second endpoint can prune its UDP candidates (or TCP) candidates. The second endpoint can adjust its timeout value based on the candidate sets offered by the first endpoint. Again if only TCP candidates offered, the second endpoint may increase the timeout value to ensure it can get a TCP relay candidate and have at least one successful path.

In this respect, the endpoints may exchange information in the form of what is referred to herein as "reduced connectivity check" messages (or more generally "modified connectivity check" messages), notifying each other of any modifications to the connectivity checks. Such messages can take any suitable format.

Note that references to "higher" and "lower" priorities do not necessarily refer to any particular numerical (or any other) representation of these priorities. Rather, a "higher priority" of a priority scheme means that assigned to a path which is favoured by that scheme as compared with another path assigned a "lower priority" irrespective of the manner in which those priorities are represented (any desired representation could be used provided it conveys the necessary information e.g. as a simple example, lower numerical values could be used to represent higher priorities). Similarly, references to reducing a threshold (e.g. probe message thresholds) or similar denote that the quantity defined by that threshold (e.g. maximum number of probe messages) is reduced, irrespective of how that threshold is represented in memory.

Whilst in the above, conventional ICE candidate pair priorities are calculated in accordance with equations 1 and 2, and then modified based on selection data to generate new priorities, alternatively the individual address priorities (computes as per equation 1) could be modified before computing the candidate pairs (as per equation 2, but applied to the modified address priorities), or similar priorities may be computed in other ways e.g. by effectively including modification terms in one or both of equations 1 or 2 which depend on the selection data.

Note herein that a "private" network refers to any network that is behind a NAT. Whilst this includes networks such as home or business networks (not shown), it also includes pseudo-public networks operated by e.g. an Internet Service Provider (ISP) with a potentially large number of users (the latter being more common in some countries than in others).

Whilst the above is described with reference to the Internet protocol suite, the relevant teachings presented herein also apply to networks e.g. with different layered architectures. Further, whilst the above is described in relation to TCP/UDP and IP, it will be appreciated that the description applies to other types of transport layer and/or network layer protocols which can be used to generate different types of network layer and/or transport layer packets.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

A first aspect of the present subject matter is directed to a computer-implemented method of establishing a media session between a first endpoint and a second endpoint via a communication network based on connectivity checks performed by the endpoints, the method comprising implementing on a computer of the first endpoint the following steps: determining by at least the first endpoint whether at least one of a set of one or more reduced connectivity check criteria is met; if it is determined by the first endpoint that none of the reduced connectivity check criteria is met: performing a full candidate pairing procedure to generate at the first endpoint for connectivity checks a full set of candidate pairs, each comprising a first candidate network address available to the first endpoint and a second candidate network address available to the second endpoint, by exchanging candidate network addresses between the first and second endpoints; if it is determined by the first endpoint that at least one of the reduced connectivity check criteria is met: performing a reduced candidate pairing procedure to generate at the first endpoint for connectivity checks a reduced set of fewer candidate pairs than the full set of candidate pairs; and establishing the media session using a candidate pair of the generated candidate pair set determined to be valid by the endpoints performing connectivity checks for at least one candidate pair of the generated candidate pair set to determine whether or not the candidate pair is valid, whereby connectivity checks are not performed for any candidate pair in the full candidate pair set that is not also in the reduced candidate pair set if it is determined that at least one of the reduced connectivity check criteria is met.

In accordance with the first aspect, under certain circumstances, connectivity checks are performed for only a "reduced" set of candidate pairs. Checking a candidate pair with probe message(s) uses bandwidth, hence by reducing the number of candidate pairs, bandwidth can be saved.

In embodiments, the full candidate pairing procedure may be performed in accordance with the ICE protocol. In this case, at least one candidate pair which should, according to the ICE protocol (that is, following strictly the rules laid down by it), should be included in the candidate pair set and thus subject to connectivity checks, is excluded, whereby connectivity checks are not performed for that pair.

Each of the reduced connectivity check criteria may be:
a network topology criterion pertaining to at least one of the endpoints, or
a historical network usage criterion pertaining to at least one of the candidate pairs, or
a network capability criterion pertaining to the networking capabilities of at least one of the endpoints, or
a network conditions criterion pertaining to the networking conditions experienced by at least one of the endpoints.

At least one of the criteria may be a network topology criterion that is met only if at least one of the endpoints is behind a firewall or network address translator.

One of the criteria may be a first network topology criterion that is met only if the first endpoint is configured to operate as a server and is behind a firewall or network address translator.

If the first network topology criterion is determined to be met, at least one candidate pair of the full candidate pair set whose first candidate network address is a host candidate network address of the first endpoint may be excluded from the reduced set, whereby connectivity checks are not performed for that candidate pair.

One of criteria may be a second network topology criterion that is met only if both of the endpoints are behind respective firewalls or network address translators.

If the second network topology criterion is determined to be met, at least one candidate pair of the full candidate pair set whose first or second candidate network address is a host candidate network address of the first endpoint or a host candidate network address of the second endpoint respectively may be excluded from the reduced set, whereby connectivity checks are not performed for that candidate pair in that event.

One of the criteria may be a third network topology criterion that is met only if the first endpoint is configured to operate as a publically reachable server of the public Internet.

If the third network topology criterion is determined to be met, at least one candidate pair of the full set whose first candidate network address is a relay candidate network address available to the first endpoint may be excluded from the reduced set, whereby connectivity checks are not performed for that candidate pair in that event.

One of the criteria may be a first historical network usage criterion that is met only if a historical usage metric determined for at least one of the candidate pairs is below a historical usage threshold, wherein that candidate pair is excluded from the reduced candidate pair set if the first historical usage criterion is met, whereby connectivity checks are not performed for that candidate pair in that event.

Each candidate pair may additionally denote a respective one of a plurality of network protocols; at least one of the criteria may be a first network capability criterion that is met only if both of the endpoints are capable of operating according to a preferred one of the network protocols.

If the first network capability criterion is determined to be met at least one candidate pair of the full set that does not denote the preferred network protocol may be excluded from the reduced set, whereby connectivity checks are not performed for that candidate pair in that event.

The first network capability criterion may be met if one of the candidate pairs denotes the preferred protocol and both the first and the second network addresses of that candidate pairs are relay candidate network addresses.

All candidate pairs of the full set that do not denote the preferred protocol may be excluded from the reduced set if the first network capability criterion is determined to be met, whereby connectivity checks are not performed for those candidate pairs in that event.

The plurality of network protocols may comprise UDP and TCP, wherein the preferred network protocol may be one of UDP or TCP, wherein at least one candidate pair denoting the other of UDP or TCP may excluded from the reduced candidate pair set if first network capability criterion is determined to be met, whereby connectivity checks are not performed for that candidate pair in that event.

The plurality of network protocols may comprise IPv4 and IPv6, wherein the preferred network protocol may be one of IPv4 or IPv6, wherein at least one candidate pair denoting the other of IPv4 or IPv6 may be excluded from the reduced candidate pair set if first network capability criterion is determined to be met, whereby connectivity checks are not performed for that candidate pair in that event.

One of the criteria may be a first network conditions criterion that is met if at least one of the endpoints is connected to the network by a connection having an available bandwidth below a bandwidth threshold.

If it is determined that at least one of the reduced connectivity check criteria does apply, in response the first endpoint may transmit to the second endpoint a reduced connectivity check message.

The reduced connectivity connect message may cause the second endpoint to transmit to the first endpoint a reduced number of candidate network messages in said exchange.

The determining step may comprise, for each of the one or more criteria:
instigating by the first endpoint a detection procedure so as to detect whether or not that criterion is satisfied; and/or
accessing by the first endpoint at least one memory location so as to access one or more stored parameters, which denote whether or not that criterion is satisfied; and/or
receiving by the first endpoint one or more electronic messages, which denote whether or not that criterion is satisfied.

The one or more electronic messages may comprise a reduced connectivity check message transmitted from the second endpoint to the first endpoint, whereby said determination may be made based at least in part on information supplied by the second endpoint in the reduced connectivity check message.

Each candidate pair may additionally denote a respective one of a plurality of network protocols; wherein the reduced connectivity check message may denote a preferred one of the network protocols, in response to which at least one candidate pair that does not denote the preferred protocol may be excluded from the reduced set by the first endpoint, whereby connectivity checks are not performed for that candidate pair in that event.

The full and reduced candidate pairing procedures may comprise respectively a full and a reduced candidate gathering procedure performed by the first endpoint;

The full candidate gathering procedure may comprise determining by the first endpoint a full candidate set of network addresses available to the first endpoint, wherein the full candidate set may be used by the first endpoint to generate the full candidate pair set and is transmitted from the first endpoint to the second endpoint in said exchange.

The reduced candidate gathering process may comprise determining by the first endpoint a reduced candidate set of fewer candidate network addresses available to the first endpoint than the full candidate set, wherein the reduced candidate set may be used by the first endpoint to generate the reduced candidate pair set and is transmitted from the first endpoint to the second endpoint in said exchange, whereby fewer network addresses are transmitted from the first endpoint to the second endpoint in the reduced candidate pairing procedure than in the full candidate pairing procedure.

For example, the first candidate network address of every candidate pair in the reduced candidate pair set may be one of the candidate network addresses of the reduced candidate set.

The full candidate gathering procedure may be performed according to the ICE protocol i.e. as specified by the rules of ICE protocol. In this case, the reduced candidate gather procedure omits at least one candidate which, according to the ICE protocol, should be included.

The full candidate gathering procedure may comprise determining both relay candidate network addresses and reflexive candidate network addresses, and the reduced candidate gathering procedure may comprise determining relay candidate network addresses or server reflexive candidate network addresses but not both.

The reflexive candidate network addresses may be determined according to the STUN protocol, and relay candidate network addresses may be determined according to the TURN protocol.

The network may be the public Internet.

A second aspect of the present subject matter is directed to a computer-implemented method of establishing a media session between a first endpoint and a second endpoint via a communication network based on connectivity checks performed by the endpoints, the method comprising implementing on a computer of the first endpoint the following steps: determining by at least the first endpoint whether at least one of a set of one or more reduced connectivity check criteria is met; generating at the first endpoint for connectivity checks a set of candidate pairs, each comprising a first network address available to the first endpoint and a second network address available to the second endpoint, by exchanging network addresses between the first and second endpoints; based on the determining step, setting by the first endpoint a probe threshold for at least one of the candidate pairs, the probe message threshold being lower if at least one of the reduced connectivity check criteria is determined to be met than if none is determined to be met; and establishing the media session using a candidate pair of the generated set determined to be valid by the endpoints performing connectivity checks for the at least one candidate pair based on the probe threshold by transmitting, by the first endpoint, a number of probe messages from the first network address of that pair to the second network address of that pair that is limited by the probe threshold.

In accordance the second aspect, under certain circumstances, the number of probe messages that is transmitted during connectivity checks is intentionally reduced in certain circumstances. Each probe message uses bandwidth, hence by reducing the number probe messages, bandwidth can be saved.

In embodiments, each of the reduced connectivity check criteria may be:
a network topology criterion pertaining to at least one of the endpoints, or
a historical network usage criterion pertaining to at least one of the candidate pairs, or
a network capability criterion pertaining to the networking capabilities of at least one of the endpoints, or
a network conditions criterion pertaining to the networking conditions experienced by at least one of the endpoints, or
a connectivity check progress criterion pertaining to the connectivity checks, which is evaluated at least once by the first endpoint during the connectivity checks, whereby the probe message threshold for the at least one candidate pair is decreased during connectivity checks if that criterion becomes met during the connectivity checks.

One of the criteria may be a first connectivity check progress criterion that is met only when at least one other candidate pair of the candidate pair set has been determined to be valid by the connectivity checks.

The first connectivity check progress criterion may be met when any single candidate pair of the candidate pair set is determined to be valid by the connectivity checks.

In response to the first connectivity check criteria becoming met, the probe message threshold for every remaining candidate pair in the candidate pair set may be reduced.

At least one of the criteria may be a network topology criterion that is met only if at least one of the endpoints is behind a firewall or network address translator.

If the at least one network topology criterion is determined to be met, the probe threshold for at least one candidate pair comprising a host network address of the endpoint(s) behind the network address translator or firewall may be set to be lower that if it is not determined to be met.

One of criteria may be a second network topology criterion that is met only if both of the endpoints are behind respective firewalls or network address translators.

The probe message threshold for at least one candidate pair of the candidate pair set whose first and second network addresses are host network addresses of the first and second endpoints respectively may be set to be lower if the second network topology criterion is determined to be met than if it is not.

One of the criteria may be a first network topology criterion that is met only if the first endpoint is configured to operate as a server and is behind a firewall or network address translator.

One of the criterion is a third network topology criterion that is met if:
at least a first candidate pair of the set comprises: (i) a first network address that is a host or reflexive candidate network address of the first endpoint and (ii) a second network address that is a relay candidate network address of the second endpoint, and
at least a second candidate pair of the set comprises: (i) a first network address that is a relay candidate network address of the first endpoint and (ii) a second network address that is a host or reflexive candidate network address of the second endpoint;
the probe message threshold for the second candidate pair may be set to be lower if the third network topology criterion is determined to be met than if it is not.

One of the criteria may be a first network conditions criterion that is met if at least one of the endpoints is connected to the network by a connection having an available bandwidth below a bandwidth threshold, wherein if the first network conditions criterion is determined to be met the probe message threshold for the at least one candidate pair may be set lower that if it is not determined to be met.

The first endpoint may determine that a network connectivity check progress criterion has become met during connectivity checks, and in response may decrease the probe message threshold for that candidate pair at a time after more than a reduced maximum number of probe messages defined by the reduced threshold have already been transmitted for that candidate pair, thereby preventing any more probe messages being transmitted for that candidate pair.

The determining step may comprise, for each of the one or more criteria:
  instigating by the first endpoint a detection procedure so as to detect whether or not that criterion is satisfied; and/or
  accessing by the first endpoint at least one memory location so as to access one or more stored parameters, which denote whether or not that criterion is satisfied; and/or
  receiving by the first endpoint one or more electronic messages, which denote whether or not that criterion is satisfied.

Each candidate pair may additionally denote a respective one of a plurality of network protocols; at least one of the criteria may be a first network capability criterion that is met only if both of the endpoints are capable of operating according to a preferred one of the network protocols, wherein the probe message threshold for at least one candidate pair of the full set that does not denote the preferred network protocol may be set to be lower if the first network capability criterion is determined to be met than if it is not.

The first network capability criterion may be met if one of the candidate pairs denotes the preferred protocol and both the first and the second network addresses of that candidate pairs are relay candidate network addresses.

Respective retry thresholds for all candidate pairs of the set that do not denote the preferred protocol may be set to be lower if the first network capability criterion is determined to be met than if it is not.

A third aspect of the subject matter is directed to a computer-implemented method of establishing a media session between a first endpoint and a second endpoint via a communication network based on connectivity checks performed by the endpoints, the method comprising implementing on a computer of the first endpoint the following steps: determining by at least the first endpoint whether any of a set of one or more connectivity check modification criteria is met; generating at the first endpoint a set of candidate pairs for connectivity checks, each comprising a first network address available to the first endpoint and a second network address available to the second endpoint, by exchanging network addresses between the first and second endpoints; assigning, by the first endpoint to each candidate pair of the candidate pair set, a respective priority, wherein: if none of the connectivity check modification criteria is determined to be met by the first endpoint, the priorities are assigned by the first endpoint according to a standardized networking protocol as specified by the standardized networking protocol, and if any of the connectivity check modification criteria is determined to be met by the first endpoint, at least one of the priorities assigned by the first endpoint is different from that specified by the standardized networking protocol; and establishing the media session using a candidate pair of the generated set determined to be valid by the endpoints performing connectivity checks for at least two of candidate pairs of the generated set in turn, in order of their determined priorities.

In embodiments, each of the one or more connectivity check modification criteria is: a network topology criterion that is met only if at least one of the endpoints is behind a firewall or network address translator, a historical network usage criterion pertaining to at least one of the candidate pairs, or a network capability criterion pertaining to the networking capabilities of at least one of the endpoints.

The standardized networking protocol may be the ICE protocol.

At least one of the criteria may be a network topology criterion that is met only if at least one of the endpoints is behind a firewall or network address translator.

One of the criteria may be a first network topology criterion that is met only if the first endpoint is configured to operate as a server and is behind a firewall or network address translator.

If the first network topology criterion is determined to be met, at least one candidate pair of the full candidate pair set whose first candidate network address is a host candidate network address of the first endpoint may be assigned a lower priority than that specified by the standardized protocol.

One of criteria may be a second network topology criterion that is met only if both of the endpoints are behind respective firewalls or network address translators.

If the second network topology criterion is determined to be met, at least one candidate pair of the full candidate pair set whose first or second candidate network address is a host candidate network address of the first endpoint or a host candidate network address of the second endpoint respectively may be assigned a lower priority than that specified by the standardized protocol.

One of the criteria may be a third network topology criterion that is met only if the first endpoint is configured to operate as a publically reachable server of the public Internet.

If the third network topology criterion is determined to be met, at least one candidate pair of the full set whose first candidate network address is a relay candidate network address available to the first endpoint may be assigned a lower priority than that specified by the standardized protocol.

One of the criteria may be a first historical network usage criterion that is met only if a historical usage metric determined for at least one of the candidate pairs is below a historical usage threshold, wherein that candidate pair may be assigned a lower priority if the first historical usage criterion is determined to be met than that specified by the standardized protocol.

Each candidate pair may additionally denote a respective one of a plurality of network protocols; wherein at least one of the criteria may be a first network capability criterion that is met only if both of the endpoints are capable of operating according to a preferred one of the network protocols.

If first network capability criterion is determined to be met, a second candidate pair of the set that does not denote the preferred network protocol may be assigned a lower priority than a first candidate pair of the set that comprises the same first and second network addresses as the second candidate pair but does not denote the preferred protocol.

The first network capability criterion may be met if one of the candidate pairs denotes the preferred protocol and both the first and the second network addresses of that candidate pair are relay candidate network addresses.

If the first network capability criterion is determined to be met, every candidate pair of the set that does not denote the preferred protocol may be assigned a lower priority than any candidate pair of the set that does, whereby connectivity checks are only performed for candidate pairs that do not denote the preferred protocol when they have been performed for every candidate pair that does.

The plurality of network protocols may comprise UDP and TCP, wherein the preferred network protocol may be one of UDP or TCP, wherein at least one candidate pair denoting the other of UDP or TCP may be assigned a lower priority if the first network capability criterion than that specified by the standardized protocol.

The plurality of network protocols may comprise IPv4 and IPv6, wherein the preferred network protocol may be one of IPv4 or IPv6, wherein at least one candidate pair denoting the other of IPv4 or IPv6 may be assigned a lower priority if the first network capability criterion is determined to be met than that specified by the standardized protocol.

The determining step may comprise, for each of the one or more criteria:
  instigating by the first endpoint a detection procedure so as to detect whether or not that criterion is satisfied; and/or
  accessing by the first endpoint at least one memory location so as to access one or more stored parameters, which denote whether or not that criterion is satisfied; and/or
  receiving by the first endpoint one or more electronic messages, which denote whether or not that criterion is satisfied.

According to a fourth aspect of the present subject matter, a computer-implemented method for effecting a media session between an initiating endpoint and a responding endpoint via a communication network comprises implementing at a computer of at least one of the initiating endpoint and responding endpoint the following steps: generating at the endpoint a set of candidate pairs, each comprising a respective network address available to the initiating endpoint and a respective network address available to the responding endpoint by exchanging network addresses between the initiating endpoint and the responding endpoint, the media session established using a candidate pair of the set determined to be valid by applying the following steps: determining by the first endpoint whether any of a set of one or more connectivity check modification criteria is met; receiving a respective type metric associated with each network address and indicative of the directness of a path through the network that would be traversed were that network address to be used for the media session; and the endpoints performing connectivity checks for at least one candidate pair selected from the set to determine whether or not the candidate pair is valid, wherein the at least one candidate pair is selected based on the type metrics and said determination.

In embodiments, each of the one or more connectivity check modification criteria may be: a network topology criterion that is met only if at least one of the endpoints is behind a firewall or network address translator, a historical network usage criterion pertaining to at least one of the candidate pairs, or a network capability criterion pertaining to the networking capabilities of at least one of the endpoints According to an fifth aspect of the present subject matter, a computer-implemented method of establishing a media session between a first endpoint and a second endpoint via a communication network based on connectivity checks performed by the endpoints comprises implementing on a computer of the first endpoint the following steps: determining by the first endpoint whether any of a set of one or more connectivity check modification criteria is met; generating at the first endpoint a set of candidate pairs for connectivity checks, each comprising a first network address available to the first endpoint and a second network address available to the second endpoint, by exchanging network addresses between the first and second endpoints; determining at the first endpoint an ordering for the candidate pair set, wherein: if none of the connectivity check modification criteria is determined to be met by the first endpoint, the ordering is determined by the first endpoint according to a standardized networking protocol as specified by the standardized networking protocol, and if any of the connectivity check modification criteria is determined to be met by the first endpoint, the ordering determined by the first endpoint is different from that specified by the standardized networking protocol; and establishing the media session using a candidate pair of the generated set determined to be valid by the endpoints performing connectivity checks for at least two of candidate pairs of the generated set in the determined order, the connectivity checks for the at least two candidate pairs being performed in turn according to the determined ordering.

A sixth aspect of the present subject matter is directed to a computer of a first endpoint for establishing a media session between the first endpoint and a second endpoint via a communication network based on connectivity checks performed by the endpoints, the computer comprising: memory holding executable code; a processor connected to the memory, wherein the code is configured when executed on the processor to implement any of the methods disclosed herein.

A seventh aspect of the present subject matter is directed to a computer program product comprising executable code stored on a computer readable storage medium, the code for establishing a media session between a first endpoint and a second endpoint via a communication network based on connectivity checks performed by the endpoints and configured when executed on a computer of the first endpoint to implement any of the method disclosed herein.

For the absolute avoidance of doubt, it is once again reiterated that any embodiment of any of the various aspects of the subject matter set out above can be implemented in embodiments of any one or more of the other aspects mutatis mutandis. Thus, for example:
  any embodiment described in relation to the first aspect which comprises excluding a candidate pair may be implemented in embodiments of the second aspect by reducing the probe message threshold for that pair, or in embodiments of the third aspect by deprioritizing that pair;
  equally, any embodiment described in relation to the second aspect which comprises reducing the probe message threshold for a candidate pair may be implemented in embodiments of the first aspect by excluding that candidate pair altogether, or in embodiments of the third aspect by deprioritizing that pair;
  equally, any embodiment described in relation to the third aspect which comprises deprioritizing a candidate pair may be implemented in embodiments of the first aspect by excluding that candidate pair altogether, or in the second embodiment by reducing the probe message threshold for that pair.

What is more, as an alternative or in addition to any of the embodiments described above, embodiments of the third aspect may be carried out according to the teaching of either or both of our co-pending U.S. patent application Ser. Nos. 14/497,058 and 14/497,141, each of which is incorporated herein by reference in its entirety.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method of establishing a media session between a first endpoint and a second endpoint via a communication network based on connectivity checks performed by the endpoints, the method comprising performing operations by the first endpoint, comprising:
generating at the first endpoint a set of candidate pairs for connectivity checks by exchanging network addresses between the first and second endpoints;
assigning, by the first endpoint, a respective priority to each candidate pair of the candidate pair set to produce a first priority ordering of the candidate pairs;
determining by the first endpoint whether one or more connectivity check modification criteria is met for each candidate pair of the candidate pair set, wherein the connectivity check modification criteria is evaluated for each candidate pair based on characteristics of a potential network path operable between the first endpoint and the second endpoint that uses the candidate pair;
modifying, by the first endpoint and based on the determination of whether the connectivity check modification criteria is met, the respective priority of each candidate pair of the candidate set to produce a second priority ordering of the candidate pairs, such that candidate pairs that meet the connectivity check modification criteria are assigned a higher priority than any candidate pair that does not meet the connectivity check modification criteria;
determining the validity of at least two of the candidate pairs by performing connectivity checks in turn according to the second priority ordering of the candidate pairs; and
establishing the media session using a candidate pair determined to be valid.

2. A method according to claim 1, wherein each of the one or more connectivity check modification criteria is: a network topology criterion that is met only if at least one of the endpoints is behind a firewall or network address translator, a historical network usage criterion pertaining to at least one of the candidate pairs, or a network capability criterion pertaining to the networking capabilities of at least one of the endpoints.

3. A method according to claim 1, wherein the assigning is based on a standardized networking protocol, and the standardized networking protocol is the Interactive Connectivity Establishment (ICE) protocol.

4. A method according to claim 2, wherein at least one of the criteria is a network topology criterion that is met only if at least one of the endpoints is behind a firewall or network address translator.

5. A method according to claim 4, wherein one of the criteria is a first network topology criterion that is met only if the first endpoint is configured to operate as a server and is behind a firewall or network address translator.

6. A method according to claim 5, wherein if the first network topology criterion is determined to be met, at least one candidate pair of the full candidate pair set whose first candidate network address is a host candidate network address of the first endpoint is assigned a lower priority than that specified by a standardized protocol.

7. A method according to claim 4, wherein one of the criteria is a second network topology criterion that is met only if both of the endpoints are behind respective firewalls or network address translators.

8. A method according to claim 7, wherein if the second network topology criterion is determined to be met, at least one candidate pair of the full candidate pair set whose first or second candidate network address is a host candidate network address of the first endpoint or a host candidate network address of the second endpoint respectively is assigned a lower priority than that specified by a standardized protocol.

9. A method according to claim 4, wherein one of the criteria is a third network topology criterion that is met only if the first endpoint is configured to operate as a publically reachable server of the public Internet, wherein if the third network topology criterion is determined to be met, at least one candidate pair of the full set whose first candidate network address is a relay candidate network address available to the first endpoint is assigned a lower priority than that specified by a standardized protocol.

10. A method according to claim 2, wherein one of the criteria is a first historical network usage criterion that is met only if a historical usage metric determined for at least one of the candidate pairs is below a historical usage threshold, wherein that candidate pair is assigned a lower priority if the first historical usage criterion is determined to be met than that specified by a standardized protocol.

11. A method according to claim 2, wherein each candidate pair additionally denotes a respective one of a plurality of network protocols; and
wherein at least one of the criteria is a first network capability criterion that is met only if both of the endpoints are capable of operating according to a preferred one of the network protocols.

12. A method according to claim 11, wherein if the first network capability criterion is determined to be met, a second candidate pair of the set that does not denote the preferred network protocol is assigned a lower priority than a first candidate pair of the set that comprises the same first and second network addresses as the second candidate pair but does not denote the preferred protocol.

13. A method according to claim 11, wherein the first network capability criterion is met if one of the candidate pairs denotes the preferred protocol and both the first and the second network addresses of that candidate pair are relay candidate network addresses.

14. A method according to claim 12, wherein if the first network capability criterion is determined to be met, every candidate pair of the set that does not denote the preferred protocol is assigned a lower priority than any candidate pair of the set that does, whereby connectivity checks are only performed for candidate pairs that do not denote the preferred protocol when they have been performed for every candidate pair that does.

15. A method according to claim 12, wherein the plurality of network protocols comprises User Datagram Protocol (UDP) and Transmission Control Protocol (TCP), wherein the preferred network protocol is one of UDP or TCP, wherein at least one candidate pair denoting the other of UDP or TCP is assigned a lower priority if the first network capability criterion is determined to be met than that specified by a standardized protocol.

16. A method according to claim 12, wherein the plurality of network protocols comprises IPv4 and IPv6, wherein the preferred network protocol is one of IPv4 or IPv6, wherein at least one candidate pair denoting the other of IPv4 or IPv6 is assigned a lower priority if the first network capability criterion is determined to be met than that specified by a standardized protocol.

17. A method according to claim 1, wherein the determining of whether one or more connectivity check modification criteria is met comprises, for each of the one or more criteria:
   instigating by the first endpoint a detection procedure so as to detect whether or not that criterion is satisfied; and/or
   accessing by the first endpoint at least one memory location so as to access one or more stored parameters, which denote whether or not that criterion is satisfied; and/or
   receiving by the first endpoint one or more electronic messages, which denote whether or not that criterion is satisfied.

18. A computing device of a first endpoint for establishing a media session between the first endpoint and a second endpoint via a communication network based on connectivity checks performed by the endpoints, the computing device comprising:
   memory holding executable code;
   a processor connected to the memory, wherein the code is configured when executed on the processor to implement operations comprising:
   generating at the first endpoint a set of candidate pairs for connectivity checks by exchanging network addresses between the first and second endpoints;
   assigning, by the first endpoint a respective priority to each candidate pair of the candidate pair set to produce a first priority ordering of the candidate pairs;
   determining by the first endpoint whether one or more connectivity check modification criteria is met for each candidate pair of the candidate pair set, wherein the connectivity check modification criteria is evaluated for each candidate pair based on characteristics of a potential network path operable between the first endpoint and the second endpoint that uses the candidate pair;
   modifying, by the first endpoint and based on the determination of whether the connectivity check modification criteria is met, the respective priority of each candidate pair of the candidate set to produce a second priority ordering of the candidate pairs, such that candidate pairs that meet the connectivity check modification criteria are assigned a higher priority than any candidate pair that does not meet the connectivity check modification criteria;
   determining the validity of at least two of the candidate pairs in turn by performing connectivity checks according to the second priority ordering of the candidate pairs; and
   establishing the media session using a candidate pair determined to be valid.

19. A computer according to claim 18, wherein the assigning is based on a standardized networking protocol, and the standardized networking protocol is the Interactive Connectivity Establishment (ICE) protocol.

20. A computer-readable storage medium, excluding a transitory signal, the computer-readable storage medium comprising executable code for establishing a media session between a first endpoint and a second endpoint via a communication network based on connectivity checks performed by the endpoints, wherein the code, when executed on a computing device of the first endpoint, causes the computing device to implement operations comprising:
   generating at the first endpoint a set of candidate pairs for connectivity checks by exchanging network addresses between the first and second endpoints;
   assigning, by the first endpoint, a respective priority to each candidate pair of the candidate pair set to produce a first priority ordering of the candidate pairs;
   determining by the first endpoint whether one or more connectivity check modification criteria is met for each candidate pair of the candidate pair set, wherein the connectivity check modification criteria is evaluated for each candidate pair based on characteristics of a potential network path operable between the first endpoint and the second endpoint that uses the candidate pair;
   modifying, by the first endpoint and based on the determination of whether the connectivity check modification criteria is met, the respective priority of each candidate pair of the candidate set to produce a second priority ordering of the candidate pairs, such that candidate pairs that meet the connectivity check modification criteria are assigned a higher priority than any candidate pair that does not meet the connectivity check modification criteria;
   determining the validity of at least two of the candidate pairs in turn by performing connectivity checks according to the second priority ordering of the candidate pairs; and
   establishing the media session using a candidate pair determined to be valid.

21. A computer-readable storage medium according to claim 20, wherein the assigning is based on a standardized networking protocol, and the standardized networking protocol is the Interactive Connectivity Establishment (ICE) protocol.

* * * * *